United States Patent
Harada et al.

(10) Patent No.: US 10,288,464 B2
(45) Date of Patent: May 14, 2019

(54) MASS FLOWMETER AND VELOCIMETER

(71) Applicant: DENSO CORPORATION, Kariya, Aichi-pref. (JP)

(72) Inventors: Toshikazu Harada, Kariya (JP); Atusi Sakaida, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 113 days.

(21) Appl. No.: 15/315,742

(22) PCT Filed: May 7, 2015

(86) PCT No.: PCT/JP2015/063198
§ 371 (c)(1),
(2) Date: Dec. 2, 2016

(87) PCT Pub. No.: WO2015/186464
PCT Pub. Date: Dec. 10, 2015

(65) Prior Publication Data
US 2017/0102255 A1 Apr. 13, 2017

(30) Foreign Application Priority Data

Jun. 3, 2014 (JP) ................................ 2014-114823
Apr. 16, 2015 (JP) ................................ 2015-084451

(51) Int. Cl.
*G01F 1/688* (2006.01)
*G01P 5/10* (2006.01)
(Continued)

(52) U.S. Cl.
CPC ............ *G01F 1/6888* (2013.01); *G01F 1/684* (2013.01); *G01P 5/10* (2013.01); *G01F 23/0007* (2013.01)

(58) Field of Classification Search
CPC .................................................. F01F 1/6888
See application file for complete search history.

(56) References Cited

U.S. PATENT DOCUMENTS 4,472,239 A 9/1984 Johnson et al.
4,624,137 A 11/1986 Johnson et al.
(Continued)

FOREIGN PATENT DOCUMENTS

JP 05-99942 A 4/1993
JP 08-136566 5/1996
(Continued)

OTHER PUBLICATIONS

"Aurum Resin Families" by DuPont as downloaded by the Internet Archive Wayback Machine on Jan. 19, 2014: http://www.dupont.com/products-and-services/plastics-polymers-resins/parts-shapes/articles/aurum-families.html.*

*Primary Examiner* — Justin N Olamit
(74) *Attorney, Agent, or Firm* — Harness, Dickey & Pierce, P.L.C.

(57) ABSTRACT

A mass flowmeter includes a flow sensor having a first sensor part and a second sensor part formed on both sides of a heater part. The flow sensor is formed of a thermoplastic resin, and is configured of a multi-layer substrate including a plurality of stacked insulating layers, and a first conductor and a second conductor and formed on these insulating layers and connected to each other. The multi-layer substrate is formed by pressurizing and heating the plurality of insulating layers for integration. When a fluid having heat released from the heater part is moved along the one face of the flow sensor, the first and the second sensor parts and generate electromotive forces in the level corresponding to temperature differences generated between the one face and the other face in the first and the second sensor parts. The flow sensor has a structure manufactured by pressurizing and heating the plurality of insulating layers for integration. The structure has no large space unlike a structure having a space immediately below a diaphragm. Thus, the flow (Continued)

sensor is less breakable than a sensor having a diaphragm structure is.

7 Claims, 20 Drawing Sheets

(51) Int. Cl.
*G01F 1/684* (2006.01)
*G01F 23/00* (2006.01)

(56) References Cited

U.S. PATENT DOCUMENTS

| | | | |
|---|---|---|---|
| 4,696,188 A | 9/1987 | Higashi | |
| 5,557,967 A * | 9/1996 | Renger | A61B 5/028 73/204.11 |
| 6,139,758 A * | 10/2000 | Tu | G01F 1/6845 205/656 |
| 2005/0229694 A1 | 10/2005 | Matsumoto et al. | |
| 2006/0070436 A1 | 4/2006 | Matsumoto et al. | |
| 2008/0000511 A1 * | 1/2008 | Kuroyanagi | H01L 35/30 136/201 |
| 2015/0144171 A1 | 5/2015 | Taniguchi et al. | |
| 2015/0289782 A1 * | 10/2015 | Peverall | G01N 33/497 600/532 |

FOREIGN PATENT DOCUMENTS

| | | |
|---|---|---|
| JP | 2003-014553 A | 1/2003 |
| JP | 2005283381 A | 10/2005 |
| JP | 2011-187619 A | 9/2011 |
| JP | 2014-007376 A | 1/2014 |
| JP | 2014-007408 A | 1/2014 |
| JP | 2014-007409 A | 1/2014 |

* cited by examiner

ABSENCE OF FLUID FLOW

PRESENCE OF FLUID FLOW

ABSENCE OF FLUID FLOW

PRESENCE OF FLUID FLOW

ABSENCE OF FLUID FLOW

PRESENCE OF FLUID FLOW

ABSENCE OF FLUID FLOW

PRESENCE OF FLUID FLOW

MOVING OBJECT IS STOPPED

MASS FLOWMETER AND VELOCIMETER

CROSS REFERENCE TO RELATED APPLICATIONS

This application is a U.S. National Phase Application under 35 U.S.C. 371 of International Application No. PCT/JP2015/063198 filed on May 7, 2015 and published in Japanese as WO 2015/186464 A1 on Dec. 10, 2015. This application is based on and claims the benefit of priority from Japanese Patent Application No. 2014-114823 filed on Jun. 3, 2014 and Japanese Patent Application No. 2015-084451 filed on Apr. 16, 2015. The entire disclosures of all of the above applications are incorporated herein by reference.

TECHNICAL FIELD

The present invention relates to a mass flowmeter and a velocimeter.

BACKGROUND ART

Conventional mass flowmeters include thermal mass flowmeters which use a flow sensor. This flow sensor has a diaphragm and a sensor chip having a space immediately below the diaphragm such that two sensor resistors and a heater resistor are formed on the diaphragm. The two sensor resistors and the heater resistor are disposed in order of the sensor resistor, the heater resistor, and the sensor resistor in the flowing direction of a fluid (e.g., see Patent Literature 1).

Sensor resistors have a resistance that varies with a temperature change. In order to reduce the influence of the heat capacity of the diaphragm to the sensor resistors, the diaphragm is formed as thin as possible. The space immediately below the diaphragm is provided to reduce thermal influence from the sensor chip to the sensor resistors.

The conventional mass flowmeter uses the sensor resistors to detect a temperature change of a fluid due to a change in the mass flow rate of the fluid.

CITATION LIST

Patent Literature

Patent Literature 1: JP-A-H08-136566

SUMMARY OF THE INVENTION

Technical Problem

As described above, the flow sensor has a diaphragm structure which includes the thin diaphragm and the space formed immediately below the diaphragm. This has a problem that the diaphragm is easily damaged by an impact.

Similarly, also in a velocimeter in which a sensor is provided on a moving object to measure the rate of travel of the moving object by using the sensor, a problem arises that the diaphragm is easily damaged by an impact when the sensor has the diaphragm structure described above.

The present invention is made in view of the points above. A first object of the present invention is to provide a mass flowmeter and a velocimeter which include a sensor less breakable than a sensor having a diaphragm structure is. Moreover, a second object of the present invention is to provide a mass flowmeter and a velocimeter which have a different method for detecting a temperature change of a fluid from the method for detecting a temperature change in the conventional mass flowmeter described above.

Solution to Problem

In order to achieve the first object, a mass flowmeter according to an invention described in claim 1 includes: a sensor (10, 20) having one face (10*a*) and an other face (10*b*) on an opposite side of the one face (10*a*), the sensor (10, 20) having a thermoelectric conversion element formed therein; and a heat source (13, 14, 240) configured to release one of heat and cold heat to a fluid present on the one face side. In the mass flowmeter, the sensor is configured of a multi-layer substrate including a plurality of stacked insulating layers (100, 110, 120, 210, 220) formed of a thermoplastic resin and a first conductor and a second conductor (130, 140, 250, 260) formed on the insulating layers, the first conductor and the second conductor (130, 140, 250, 260) are formed of different conductors, the first conductor and the second conductor (130, 140, 250, 260) are connected to each other, and the multi-layer substrate is formed by pressurizing and heating the plurality of insulating layers to integrate them. The thermoelectric conversion element is configured of the first conductor and the second conductor connected to each other, and when the fluid having heat released from the heat source is moved along the one face, the thermoelectric conversion element is configured to generate an electrical output corresponding to a temperature difference generated between a first region located on the one face and a second region located at a position different from the first region in the sensor. The mass flowmeter further includes an operating unit (2) configured to calculate a mass flow rate of the fluid based on the output generated in the thermoelectric conversion element and a relationship between the output and a mass flow rate of the fluid.

Here, when the mass flow rate of the fluid is changed in the state in which heat is released from the heat source to the fluid on the one face side of the sensor, the temperature of the fluid on the one face side of the sensor is changed. In the present invention, when the fluid having heat released from the heat source moves along the one face of the sensor, the thermoelectric conversion element is configured to generate an electrical output corresponding to the temperature on the one face side of the sensor. Thus, according to the present invention, a temperature change in the fluid in association with a change in the mass flow rate of the fluid can be detected based on the output of the thermoelectric conversion element. Accordingly, the mass flow rate of the fluid can be found from the output.

The sensor used in the present invention has a structure manufactured by pressurizing and heating a plurality of insulating layers. The structure has no large space unlike a structure having a space immediately below a diaphragm. Thus, according to the present invention, a mass flowmeter including a sensor that is less breakable than a sensor having a diaphragm structure can be provided.

In order to achieve the first object, a velocimeter according to an invention described in claim 9 includes: a sensor (10, 20) installed on a moving object moved in a fluid, the sensor (10, 20) having one face (10*a*) and an other face (10*b*) on an opposite side of the one face (10*a*), the sensor (10, 20) having a thermoelectric conversion element formed therein; and a heat source (13, 14, 240) configured to release one of heat and cold heat to a fluid present on the one face side. In the velocimeter, the sensor is comprised of a multi-layer substrate including a plurality of stacked insulating layers (100, 110, 120, 210, 220) formed of a thermoplastic resin and a first conductor and a second conductor (130, 140, 250, 260) formed on the insulating layers, the first conductor and the second conductor (130, 140, 250, 260) are formed of different conductors, the first conductor and the second conductor (130, 140, 250, 260) are connected to each other, and the multi-layer substrate is formed by pressurizing and heating the plurality of insulating layers so as to be integrated. The thermoelectric conversion element is configured of the first conductor and the second conductor connected to each other, and when the fluid having heat released from the heat source is relatively moved along the one face when viewed from the sensor, the thermoelectric conversion element is configured to generate an electrical output corresponding to a temperature difference generated between a first region located on the one face and a second region located at a position different from the first region in the sensor. The velocimeter further includes an operating unit (2) configured to calculate a rate of travel of the moving object based on the output generated in the thermoelectric conversion element and a relationship between the output and a rate of travel of the moving object.

Here, when the rate of travel of the moving object is changed in the state in which heat is released from the heat source to the fluid on the one face side of the sensor, the temperature of the fluid present on the one face side of the sensor is changed when viewed from the sensor. In the present invention, when the fluid having heat released from the heat source moves along the one face of the sensor when viewed from the sensor, the thermoelectric conversion element is configured to generate an electrical output corresponding to the temperature on the one face side of the sensor. Thus, according to the present invention, a temperature change in the fluid in association with a change in the rate of travel of the moving object can be detected based on the output of the thermoelectric conversion element. Accordingly, the rate of travel of the moving object can be found from the output.

The sensor used in the present invention has a structure manufactured by pressurizing and heating a plurality of insulating layers. The structure has no large space unlike a structure having a space immediately below a diaphragm. Thus, according to the present invention, a velocimeter including a sensor that is less breakable than a sensor having a diaphragm structure can be provided.

In order to achieve the first object, a mass flowmeter according to an invention described in claim 10 includes: a sensor (10, 20) having one face (10*a*) and an other face (10*b*) on an opposite side of the one face (10*a*), the sensor (10, 20) having a thermoelectric conversion element formed therein; and a heat source (13, 14, 240) configured to release one of heat and cold heat to a fluid present on the one face side. In the mass flowmeter, the sensor includes insulating layers (100, 110, 120, 210, 220) formed of a flexible material and a first conductor and a second conductor (130, 140, 250, 260) formed on the insulating layers, the first conductor and the second conductor (130, 140, 250, 260) are formed of different conductors, the first conductor and the second conductor (130, 140, 250, 260) are connected to each other, and the insulating layers, the first conductor, and the second conductor are pressurized being heated for integration. The thermoelectric conversion element is comprised of the first conductor and the second conductor connected to each other, and when the fluid having heat released from the heat source is moved along the one face, the thermoelectric conversion element is configured to generate an electrical output corresponding to a temperature difference generated between a first region located on the one face and a second region located at a position different from the first region in the sensor. The mass flowmeter further includes an operating unit (2) configured to calculate a mass flow rate of the fluid based on the output generated in the thermoelectric conversion element and a relationship between the output and a mass flow rate of the fluid.

Similarly to the invention described in claim 1, according to the present invention, the mass flow rate of the fluid can be found from the output of the thermoelectric conversion element. The sensor used in the present invention has a structure manufactured by pressurizing and heating the insulating layers and the first and the second conductors for integration. The structure has no large space unlike a structure having a space immediately below a diaphragm. Thus, according to the present invention, a mass flowmeter including a sensor that is less breakable than a sensor having a diaphragm structure can be provided.

In order to achieve the first object, a mass flowmeter according to an invention described in claim 12 includes: a sensor (10, 20) having one face (10*a*) and an other face (10*b*) on an opposite side of the one face (10*a*), the sensor (10, 20) having a thermoelectric conversion element formed therein; and a heat source (13, 14, 240) configured to release one of heat and cold heat to a fluid present on the one face side. In the mass flowmeter, the sensor is a solid structure including a first conductor and a second conductor (130, 140, 250, 260) formed of different conductors, the first conductor and the second conductor (130, 140, 250, 260) are connected to each other, the thermoelectric conversion element is configured of the first conductor and the second conductor connected to each other, and when the fluid having heat released from the heat source is moved along the one face, the thermoelectric conversion element is configured to generate an electrical output corresponding to a temperature difference generated between a first region located on the one face and a second region located at a position different from the first region in the sensor. The mass flowmeter further includes an operating unit (2) configured to operate a mass flow rate of the fluid based on the output generated in the thermoelectric conversion element and a relationship between the output and a mass flow rate of the fluid.

Similarly to the invention described in claim 1, according to the present invention, the mass flow rate of the fluid can be found from the output of the thermoelectric conversion element. The sensor used in the present invention is a solid structure in a structure having no large space in the inside of the sensor unlike a structure having a space immediately below a diaphragm. Thus, according to the present invention, a mass flowmeter including a sensor that is less breakable than a sensor having a diaphragm structure can be provided.

The solid structure referred here means a structure with no space in the absence of a large space like a space immediately below the diaphragm of the conventional flow sensor. However, this does not mean that structures with a small space formed between the components configuring the sensor are excluded.

In order to achieve the second object, a mass flowmeter according to an invention descried in claim 13 includes: a sensor (10, 20) having one face (10*a*) and an other face (10*b*) on an opposite side of the one face (10*a*), the sensor (10, 20) having a thermoelectric conversion element formed therein; and a heat source (13, 14, 240) configured to release one of heat and cold heat to a fluid present on the one face side. In the mass flowmeter, the thermoelectric conversion element is configured of a first conductor and a second conductor, which are different conductors, the first conductor and the second conductor are connected to each other, and when the fluid having heat released from the heat source is moved along the one face, the thermoelectric conversion element is configured to generate an electrical output corresponding to a temperature difference generated between a first region located on the one face and a second region located at a position different from the first region in the sensor. The mass flowmeter further includes an operating unit (2) configured to operate a mass flow rate of the fluid based on the output generated in the thermoelectric conversion element and a relationship between the output and a mass flow rate of the fluid.

Here, when the mass flow rate of the fluid is changed in the state in which heat is released from the heat source to the fluid on the one face side of the sensor, the temperature of the fluid on the one face side of the sensor is changed. In the present invention, when the fluid having heat released from the heat source is moved along the one face of the sensor, the thermoelectric conversion element is configured to generate an electrical output corresponding to the temperature on the one face side of the sensor. Thus, according to the present invention, a temperature change in the fluid in association with a change in the mass flow rate of the fluid can be detected based on the output of the thermoelectric conversion element. Consequently, the mass flow rate of the fluid can be found from the output. Accordingly, according to the present invention, a mass flowmeter can be provided, which has a detection method for a temperature change in a fluid different from the detection method of the above conventional mass flowmeter.

In order to achieve the first object, a velocimeter according to an invention described in claim 15 includes: a sensor (10, 20) installed on a moving object moved in a fluid, the sensor (10, 20) having one face (10*a*) and an other face (10*b*) on an opposite side of the one face (10*a*), the sensor (10, 20) having a thermoelectric conversion element formed therein; and a heat source (13, 14, 240) configured to release one of heat and cold heat to a fluid present on the one face side. In the velocimeter, the sensor includes insulating layers (100, 110, 120, 210, 220) formed of a flexible material and a first conductor and a second conductor (130, 140, 250, 260) formed on the insulating layers, the first conductor and the second conductor (130, 140, 250, 260) are formed of different conductors, the first conductor and the second conductor (130, 140, 250, 260) are connected to each other, and the insulating layers, the first conductor, and the second conductor are pressurized being heated for integration. The thermoelectric conversion element is configured of the first conductor and the second conductor connected to each other, and when the fluid having heat released from the heat source is relatively moved along the one face when viewed from the sensor, the thermoelectric conversion element is configured to generate an electrical output corresponding to a temperature difference generated between a first region located on the one face and a second region located at a position different from the first region in the sensor. The velocimeter further includes operating unit (2) configured to calculate a rate of travel of the moving object based on the output generated in the thermoelectric conversion element and a relationship between the output and a rate of travel of the moving object.

Similarly to the invention described in claim 9, according to the present invention, the rate of travel of the moving object can be found from the output of the thermoelectric conversion element. The sensor used in the present invention has a structure manufactured by pressurizing and heating the insulating layers and the first and the second conductors for integration. The structure has no large space unlike a structure having a space immediately below a diaphragm. Thus, according to the present invention, a velocimeter including a sensor that is less breakable than a sensor having a diaphragm structure can be provided.

In order to achieve the first object, a velocimeter according to an invention described in claim 17 includes: a sensor (10, 20) installed on a moving object moved in a fluid, the sensor (10, 20) having one face (10*a*) and an other face (10*b*) on an opposite side of the one face (10*a*), the sensor (10, 20) having a thermoelectric conversion element formed therein; and a heat source (13, 14, 240) configured to release one of heat and cold heat to a fluid present on the one face side. In the velocimeter, the sensor is a solid structure including a first conductor and a second conductor (130, 140, 250, 260) formed of different conductors, and the first conductor and the second conductor (130, 140, 250, 260) are connected to each other. The thermoelectric conversion element is configured of the first conductor and the second conductor connected to each other, and when the fluid having heat released from the heat source is relatively moved along the one face when viewed from the sensor, the thermoelectric conversion element is configured to generate an electrical output corresponding to a temperature difference generated between a first region located on the one face and a second region located at a position different from the first region in the sensor. The velocimeter further includes operating unit (2) configured to operate a rate of travel of the moving object based on the output generated in the thermoelectric conversion element and a relationship between the output and a rate of travel of the moving object.

Similarly to the invention described in claim 9, according to the present invention, the rate of travel of the moving object can be found from the output of the thermoelectric conversion element. The sensor used in the present invention is a solid structure in a structure having no large space in the inside of the sensor unlike a structure having a space immediately below a diaphragm. Thus, according to the present invention, a velocimeter including a sensor that is less breakable than a sensor having a diaphragm structure can be provided.

Note that, the solid structure referred here means a structure with no space in the absence of a large space like a space immediately below the diaphragm of the conventional flow sensor. However, this does not mean that structures with a small space formed between the components configuring the sensor are excluded.

In order to achieve the second object, a velocimeter according to an invention described in claim 18 includes: a sensor (10, 20) installed on a moving object moved in a fluid, the sensor (10, 20) having one face (10*a*) and an other face (10*b*) on an opposite side of the one face (10*a*), the sensor (10, 20) having a thermoelectric conversion element formed therein; and a heat source (13, 14, 240) configured to release one of heat and cold heat to a fluid present on the one face side. In the velocimeter, the thermoelectric conversion element is configured of a first conductor and a second conductor, which are different conductors, the first conductor and the second conductor are connected to each other, and when the fluid having heat released from the heat source is relatively moved along the one face when viewed from the sensor, the thermoelectric conversion element is configured to generate an electrical output corresponding to a temperature difference generated between a first region located on the one face and a second region located at a position different from the first region in the sensor. The velocimeter further includes operating unit (2) configured to operate a rate of travel of the moving object based on the output generated in the thermoelectric conversion element and a relationship between the output and a rate of travel of the moving object.

Here, when the rate of travel of the moving object is changed in the state in which heat is released from the heat source to the fluid on the one face side of the sensor, the temperature of the fluid present on the one face side of the sensor is changed when viewed from the sensor. In the present invention, when the fluid having heat released from the heat source is relatively moved along the one face of the sensor when viewed from the sensor, the thermoelectric conversion element is configured to generate an electrical output corresponding to the temperature on the one face side of the sensor. Thus, according to the present invention, a temperature change in the fluid in association with a change in the rate of travel of the moving object can be detected based on the output of the thermoelectric conversion element. Consequently, the rate of travel of the moving object can be found from the output. Accordingly, according to the present invention, a velocimeter can be provided, which has a detection method for a temperature change in a fluid different from the detection method of the above conventional mass flowmeter.

Note that the reference signs of components in parentheses described in this section and claims are examples showing the corresponding relationship to specific members described in embodiments, described later.

DESCRIPTION OF EMBODIMENTS

Figure 1:
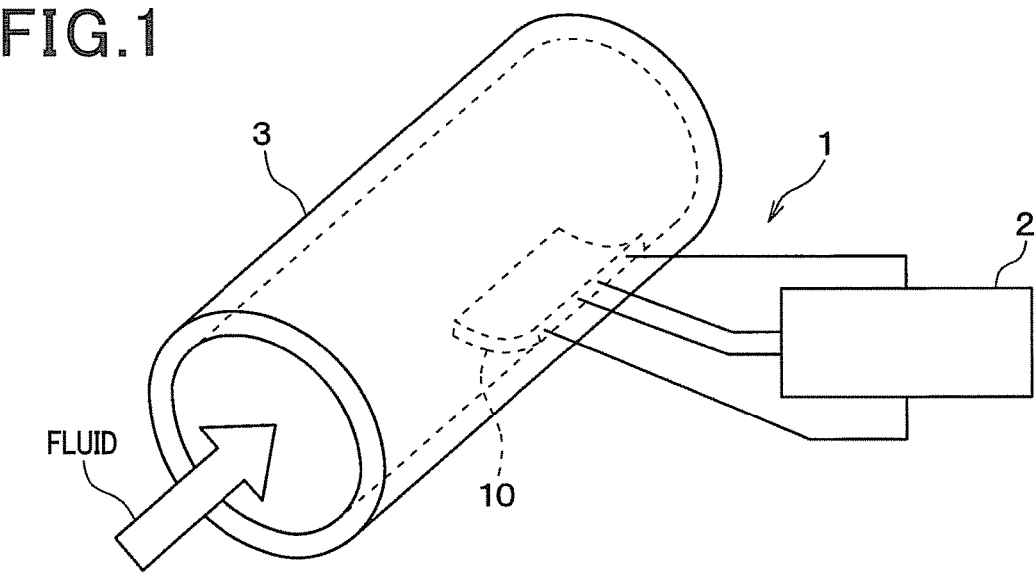
FIG. 1 is a diagram of the overall structure of a mass flowmeter according to a first embodiment.

In the following, referring to the drawings, embodiments of the present invention will be described. In the embodiments below, the same or similar components are denoted by the same reference signs for making description.

(First Embodiment)

In the present embodiment, a mass flowmeter that measures the mass flow rate of a fluid flowing in a pipe will be described. As shown in FIG. 1, a mass flowmeter 1 includes one flow sensor 10 and one controller 2.

The flow sensor 10 is installed inside a pipe 3, which is the measurement location of the mass flow rate of a fluid, and outputs sensor signals corresponding to the mass flow rate of the fluid flowing in the pipe 3 to the controller 2. The flow sensor 10 is in a rectangular flat plate shape having one face and the other face on the opposite side of the one face. The flow sensor 10 is attached to the inner surface of the pipe 3 via an adhesive layer, not shown, being curved along the inner surface of the tubular pipe 3.

The pipe 3 is formed of a resin that is a material resistant to heat transfer compared with the fluid flowing in the pipe 3.

Figure 2A:
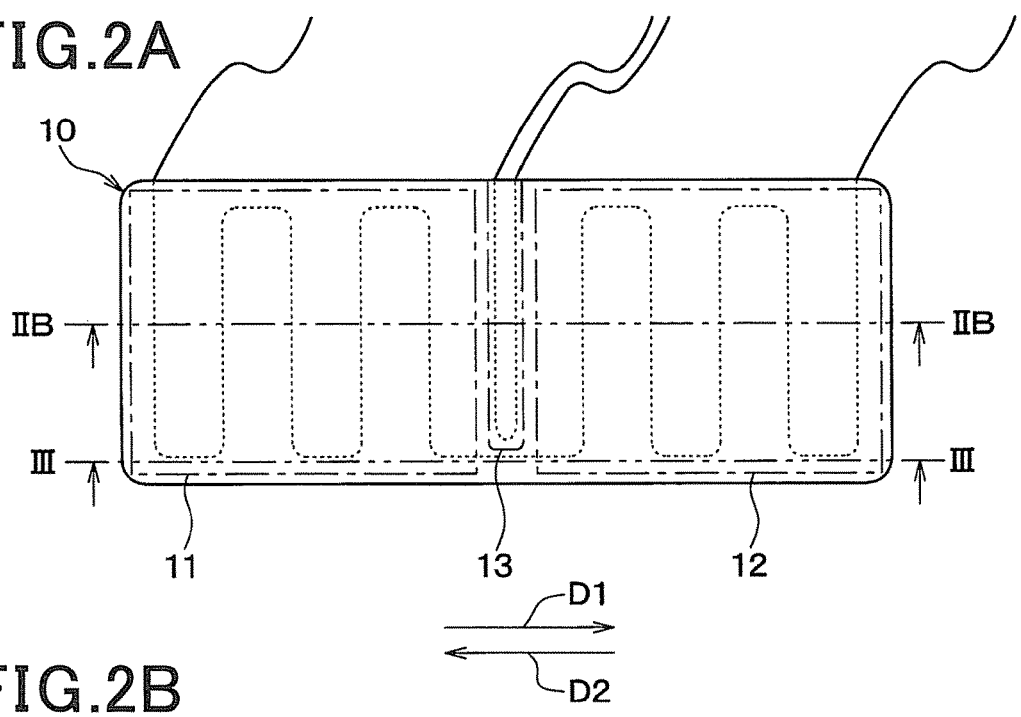
FIG. 2A is a plan view of a flow sensor in FIG. 1.
Figure 2B:
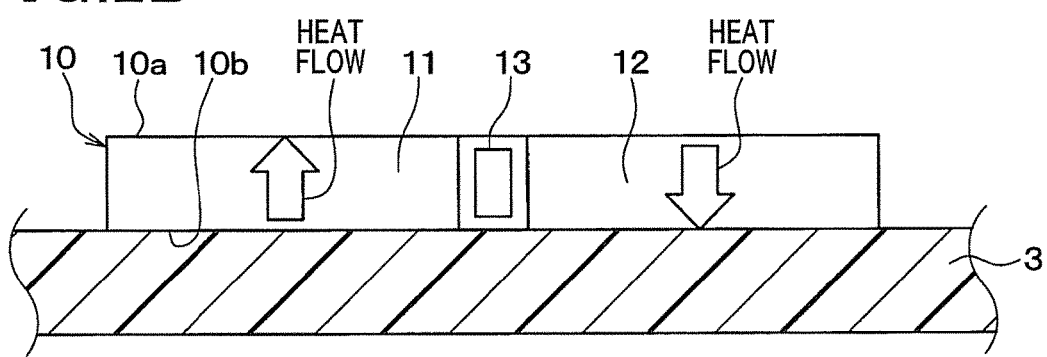
FIG. 2B is a schematic diagram corresponding to a cross section taken along line IIB-IIB in FIG. 2A.

As shown in FIGS. 2A and 2B, the flow sensor 10 is configured of a multi-layer substrate having a top face 10a and a lower face 10b on the opposite side of the top face 10a. In the following, the flow sensor 10 is also referred to as a multi-layer substrate 10. The top face 10a and the lower face 10b correspond to the one face and the other face of the flow sensor 10, respectively.

This flow sensor 10 includes a first sensor part 11, a second sensor part 12, and a heater part 13 formed in one multi-layer substrate 10. The first and the second sensor parts 11 and 12 and the heater part 13 are arranged in order of the first sensor part 11, the heater part 13, and the second sensor part 12 in a direction parallel to the top face 10a and the lower face 10b of the multi-layer substrate 10. The flow sensor 10 is installed in the inside of the pipe 3, which is the measurement location of the mass flow rate of a fluid as the first and the second sensor parts 11 and 12 are located on both sides of the heater part 13 in the direction in parallel with flowing directions D1 and D2 of the fluid. In the present embodiment, the first and the second sensor parts 11 and 12 and the heater part 13 are arranged in the direction in parallel with the top face 10a and the lower face 10b of the multi-layer substrate 10. However, they are not necessarily strictly arranged in the direction in parallel with the top face 10a and the lower face 10b of the multi-layer substrate 10. They only have to be arranged in the direction along the top face 10a and the lower face 10b of the multi-layer substrate 10.

The first and the second sensor parts 11 and 12 are each formed with a thermoelectric conversion element that generates electromotive force, i.e., a voltage corresponding to the level of a heat flow passed through the inside of the multi-layer substrate 10 in the direction perpendicular to the top face 10a and the lower face 10b of the multi-layer substrate 10. In other words, the first and the second sensor parts 11 and 12 are each formed with a thermoelectric conversion element that generates electromotive force corresponding to the temperature difference between the top face 10a and the lower face 10b of the multi-layer substrate 10.

In the present embodiment, the thermoelectric conversion elements formed in the first and the second sensor parts 11 and 12 correspond to first and second thermoelectric conversion elements, respectively, described in claims. In the present embodiment, the first and the second sensor parts 11 and 12 correspond to regions in which the first and the second thermoelectric conversion elements described in claims are formed. On the top face 10a of the flow sensor 10, the region of the first sensor part 11 corresponds to a first region located on one face of the sensor described in claims. On the lower face 10b of the flow sensor 10, the region of the first sensor part 11 corresponds to a second region located at a position different from the first region of the sensor. Similarly, on the top face 10a of the flow sensor 10, the region of the second sensor part 12 corresponds to the first region located on the one face of the sensor described in claims. On the lower face 10b of the flow sensor 10, the region of the second sensor part 12 corresponds to the second region located at a position different from the first region of the sensor.

The first and the second sensor parts 11 and 12 are configured to have the inverse relationship between the polarities of electromotive forces generated by heat flows of the same orientation. In the present embodiment, when the orientation of a heat flow passed through the inside of the first sensor part 11 is upward as indicated by the arrow in FIG. 2B, the first sensor part 11 is configured in which electromotive force (a voltage) generated in the first sensor part 11 has a positive value. On the other hand, when the orientation of a heat flow passed through the inside of the second sensor part 12 is downward as indicated by the arrow in FIG. 2B, the second sensor part 12 is configured in which electromotive force (a voltage) generated in the second sensor part 12 has a positive value.

In the present embodiment, the first and the second sensor parts 11 and 12 are equal in shape and size, and distances from the heater part 13 to the first and the second sensor parts 11 and 12 are equal. In other words, the first and the second sensor parts 11 and 12 have a relationship of axial symmetry with respect to the center line of the heater part 13 passing through the center of the heater part 13 in the direction parallel with the top face 10a of the flow sensor 10 and perpendicular to the top face 10a.

As indicated by the broken line in FIG. 2A, the first sensor part 11 is electrically connected in series to the second sensor part 12, and the first and the second sensor parts 11 and 12 are electrically connected to the controller 2. The broken line in FIG. 2A depicts wiring. Thus, the total electromotive force combining the electromotive forces of the first and the second sensor parts 11 and 12 is outputted from the flow sensor 10 to the controller 2.

The heater part 13 is a heat source that generates heat. In the present embodiment, the heater part 13 is configured of a heating element that generates heat by carrying a current through a nichrome wire, for example. The heater part 13 is electrically connected to the controller 2.

The controller 2 is an electronic controller configured of a microcomputer, a memory as a storage means, and their peripheral circuits, for example. The controller 2 functions as an operating unit that performs arithmetic processing of the mass flow rate of a fluid based on sensor signals (electromotive force) outputted from the flow sensor 10. The controller 2 also functions as a control unit that controls the heater part 13 to operate and halt.

Next, a specific internal structure of the flow sensor 10 will be described.

Figure 3:
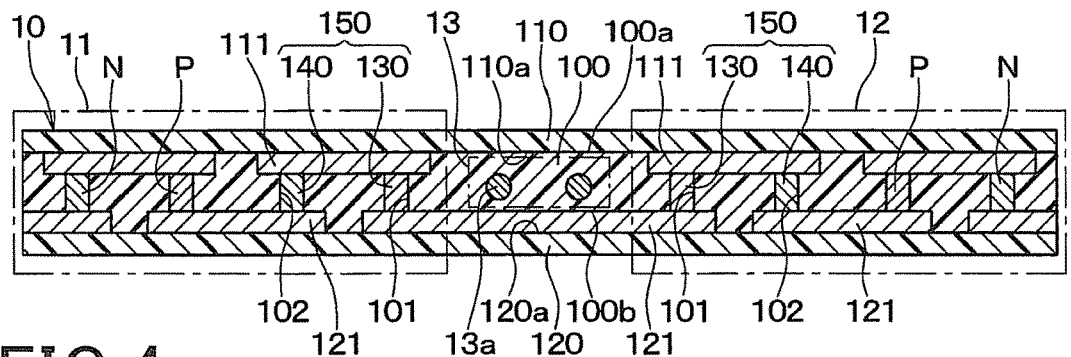
FIG. 3 is a cross-sectional view taken along line III-III in FIG. 2A.

As shown in FIG. 3, the flow sensor 10 is configured of a multi-layer substrate including an integrated stack of an insulating base material 100, a front face protective member 110 disposed on a front face 100a of the insulating base material 100, and a rear face protective member 120 disposed on a rear face 100b of the insulating base material 100. The insulating base material 100, the front face protective member 110, and the rear face protective member 120 are formed of thermoplastic resin films, in a flat rectangular shape represented by polyether ether ketone (PEEK), polyether imide (PEI), the liquid crystal polymer (LCP), and the like. As described above, the flow sensor 10 according to the present embodiment is a sensor having a stack of a plurality of insulating layers formed of thermoplastic resins with flexibility. Thus, the flow sensor 10 can be attached to the inner surface of the pipe 3 in the curved state in conformity with the inner surface of the tubular pipe 3.

In the first and the second sensor parts 11 and 12, the insulating base material 100 is formed with a plurality of first and second via holes 101 and 102 penetrating the insulating base material 100 in the thickness direction. Although not shown in the drawing, the plurality of first and second via holes 101 and 102 is formed in a zigzag pattern in which the first and the second via holes 101 and 102 are alternated with each other in the planar direction of the insulating base material 100. The structure of the first sensor part 11 and the structure of the second sensor part 12 are in a relationship of axial symmetry with respect to the heater part 13 in the same basic structures.

A first interlayer connecting member 130 is disposed in the first via hole 101. A second interlayer connecting member 140 is disposed in the second via hole 102. In other words, on the insulating base material 100, the first and the second interlayer connecting members 130 and 140 are disposed being alternated with each other.

The first and the second interlayer connecting members 130 and 140 are formed of conductors different from each other for exerting the Seebeck effect. The conductor is a conductive material, such as metals and semiconductors. Therefore, in the present embodiment, the first interlayer connecting members 130 and the second interlayer connecting member 140 correspond to a first conductor and a second conductor, respectively, described in claims.

For example, the first interlayer connecting member 130 is formed of a solid-phase sintered metal compound so that Bi—Sb—Te alloy powder forming a p-type keeps the crystal structure of a plurality of metal atoms before sintered. The second interlayer connecting member 140 is formed of a solid-phase sintered metal compound so that Bi—Te alloy powder forming an n-type keeps the crystal structure of a plurality of metal atoms before sintered.

On the front face protective member 110, a plurality of front face patterns 111 is formed being patterned on copper foil, for example, on the one face 110a side opposed to the insulating base material 100. The front face patterns 111 are apart from each other. The front face patterns 111 are each appropriately electrically connected to the first and the second interlayer connecting members 130 and 140.

Specifically, as shown in FIG. 3, when one first interlayer connecting member 130 and one second interlayer connecting member 140 adjacent to each other are combined as one set 150, the sets 150 of the first and the second interlayer connecting members 130 and 140 are connected to the same front face patterns 111. In other words, the sets 150 of the first and the second interlayer connecting members 130 and 140 are electrically connected to each other via the front face pattern 111.

On the rear face protective member 120, a plurality of rear face patterns 121 is formed being patterned on copper foil, for example, on the one face 120a side opposed to the insulating base material 100. The rear face patterns 121 are apart from each other. The rear face patterns 121 are each appropriately electrically connected to the first and the second interlayer connecting members 130 and 140.

Specifically, as shown in FIG. 3, in two sets 150 adjacent to each other, the first interlayer connecting member 130 of one set 150 and the second interlayer connecting member 140 of the other set 150 are connected to the same rear face pattern 121. In other words, the first and the second interlayer connecting members 130 and 140 are electrically connected to each other via the same rear face pattern 121 over the sets 150.

Thus, the sets 150 are connected in series to each other, and arranged in the multi-layer substrate being repeatedly bent as depicted by the broken line in FIG. 2A. A set of the first and the second interlayer connecting members 130 and 140 connected to each other configures one thermoelectric conversion element. Therefore, the first and the second sensor parts 11 and 12 each include a plurality of thermoelectric conversion elements connected in series to each other. The thermoelectric conversion element formed in the first sensor part 11 is a first thermoelectric conversion element. The thermoelectric conversion element formed in the second sensor part 12 is a second thermoelectric conversion element.

In the heater part 13 of the multi-layer substrate, a heating element 13a is embedded in the inside of the insulating base material 100. Under the heater part 13 of the multi-layer substrate, the rear face pattern 121 is formed being stretched below the heater part 13. Through this rear face pattern 121, the first and the second interlayer connecting members 130 and 140 of the first sensor part 11 are connected in series to the first and the second interlayer connecting members 130 and 140 of the second sensor part 12.

The basic configuration of the flow sensor 10 according to the present embodiment is described above. In this flow sensor 10, in the respective regions of the first and the second sensor parts 11 and 12 of the multi-layer substrate 10, the top ends of the first and the second interlayer connecting members 130 and 140 connected to each other are located on the top face 10a side of the multi-layer substrate 10, and the lower ends are located on the lower face 10b side of the multi-layer substrate 10. Thus, when a temperature difference is generated between the top face 10a and the lower face 10b of the multi-layer substrate 10 in the region of the first sensor part 11 of the multi-layer substrate 10, electromotive force corresponding to the temperature difference is generated in the first and the second interlayer connecting members 130 and 140 alternately connected in series to each other in the first sensor part 11. Similarly, in the region of the second sensor part 12 of the multi-layer substrate 10, when a temperature difference is generated between the top face 10a and the lower face 10b of the multi-layer substrate 10, electromotive force corresponding to the temperature difference is generated in the first and the second interlayer connecting members 130 and 140 alternately connected in series to each other in the second sensor part 12.

As described above, in the present embodiment, the first and the second interlayer connecting members 130 and 140 are disposed in the first and the second via holes 101 and 102, respectively. Thus, the numbers, diameters, gaps, and other parameters of the first and the second via holes 101 and 102 are appropriately changed to increase the density of the first and the second interlayer connecting members 130 and 140. Accordingly, electromotive force generated between the first and the second interlayer connecting members 130 and 140 alternately connected in series to each other can be increased, allowing an increase in the sensitivities of the first and the second sensor parts 11 and 12.

As described above, the metals forming the first and the second interlayer connecting members 130 and 140 are sintering alloys sintered in the state in which a plurality of metal atoms maintain the crystal structure thereof. Thus, electromotive force generated between the first and the second interlayer connecting members 130 and 140 alternately connected in series to each other can be increased, allowing an increase in the sensitivities of the first and the second sensor parts 11 and 12.

As described above, the structure of the first sensor part 11 and the structure of the second sensor part 12 have a relationship in axial symmetry based on the heater part 13. In other words, the order of connecting the first interlayer connecting member 130 to the second interlayer connecting member 140 is the inverse relationship. Thus, in the first and the second sensor parts 11 and 12, the polarities of the generated electromotive forces are inverted.

Next, referring to FIG. 4, a manufacturing method for the flow sensor 10 will be described.

Figure 4:
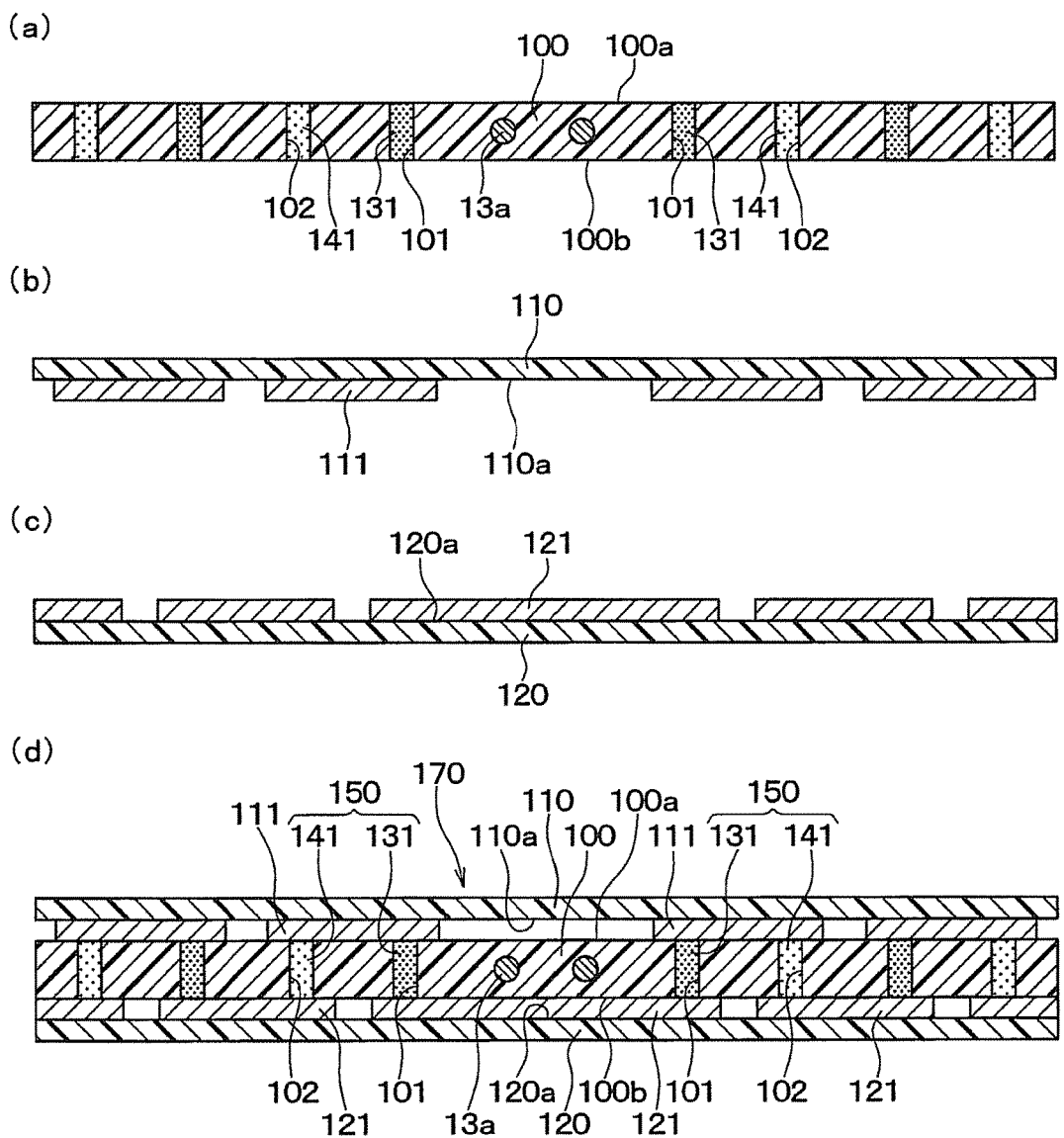
FIG. 4 is cross-sectional views for explaining the manufacturing process steps of the flow sensor.

First, the insulating base material 100 shown in (a) in FIG. 4 is prepared. The insulating base material 100 is formed as below.

The insulating base material 100 in which the heating element 13a is embedded is prepared. A plurality of first via holes 101 is formed by drilling, laser, or the like. Subsequently, the first via holes 101 are filled with a first conductive paste 131. A method (a device) for filling the first via holes 101 with the first conductive paste 131 may be a method (a device) described in Japanese Patent Application No. 2010-50356 by the present applicant.

In brief description, although not shown in the drawing, the insulating base material 100 is disposed on a holder through an adsorbing sheet so that the rear face 100b is opposed to the adsorptive sheet. The first conductive paste 131 is filled in the first via hole 101 while melting the first conductive paste 131. Thus, most of the organic solvent of the first conductive paste 131 is adsorbed to the adsorptive sheet, and alloy powder is disposed on the first via hole 101 in close contact.

The adsorptive sheet may be any material that can absorb the organic solvent of the first conductive paste 131. A typical high quality paper sheet and the like are used. As the first conductive paste 131, a paste is used, in which Bi—Sb—Te alloy powder having metal atoms maintaining a predetermined crystal structure is formed in a paste by adding an organic solvent, such as paraffin, whose melting point is a temperature of 43° C. Thus, in filling the first conductive paste 131, the front face 100a of the insulating base material 100 is heated at a temperature of about 43° C.

Subsequently, a plurality of second via holes 102 is formed on the insulating base material 100 by drilling, laser, or the like. As described above, the second via holes 102 are formed so that the second via holes 102 are alternated with the first via holes 101 and form a zigzag pattern together with the first via holes 101.

Subsequently, the second via holes 102 are filled with a second conductive paste 141. This process can be performed similarly to filling the first conductive paste 131. In other words, although not shown in the drawing, after the insulating base material 100 is disposed on a holder through an adsorbing sheet so that the rear face 100b is opposed to the adsorptive sheet, the second conductive paste 141 is filled in the second via holes 102. Thus, most of the organic solvent of the second conductive paste 141 is adsorbed to the adsorptive sheet, and alloy powder is disposed in the second via holes 102 in close contact.

As the second conductive paste 141, a paste is used, in which Bi—Te alloy powder having metal atoms, which are different from the metal atoms forming the first conductive paste 131, maintaining a predetermined crystal structure is formed in a paste by adding an organic solvent, such as terpineol, whose melting point is room temperature. In other words, as the organic solvent forming the second conductive paste 141, an organic solvent having a melting point lower than the melting point of the organic solvent forming the first conductive paste 131 is used. In filling the second conductive paste 141, the temperature of the front face 100a of the insulating base material 100 is held at room temperature. In other words, in filling the second conductive paste 141, the organic solvent contained in the first conductive paste 131 is hardened. Thus, the second conductive paste 141 is prevented from being mixed in the first via hole 101.

The organic solvent contained in the first conductive paste 131 being hardened is an organic solvent that is not adsorbed to the adsorptive sheet and remains in the first via hole 101 in the process of filling the first conductive paste 131.

The front face protective member 110 and the rear face protective member 120 shown in (b) and (c) in FIG. 4 are prepared. These members are formed as below. First, copper foil, for example, is formed on the one faces 110a and 120a of the front face protective member 110 and the rear face protective member 120 opposed to the insulating base material 100. By appropriately patterning the copper foil, the plurality of front face patterns 111 apart from each other and the plurality of rear face patterns 121 apart from each other are formed on the front face protective member 110 and the rear face protective member 120.

After that, as shown in (d) in FIG. 4, the rear face protective member 120, the insulating base material 100, and the front face protective member 110 are sequentially stacked to form a laminate 170. This laminate 170 is disposed between a pair of pressing plates, not shown, and the laminate 170 is pressurized from the top face and the lower face in the stacking direction being heated in a vacuum state. Thus, the laminate is integrated. Specifically, the first and the second conductive pastes 131 and 141 are solid-phase sintered to form the first and the second interlayer connecting members 130 and 140, and the laminate 170 is pressurized being heated so that the first and the second interlayer connecting members 130 and 140 are connected to the front face pattern 111 and the rear face pattern 121 for integrating the laminate 170.

In integrating the laminate 170, a cushioning material such as rock wool paper, but not limited thereto, may be disposed between the laminate 170 and the pressing plates. As described above, the flow sensor 10 is manufactured.

Figure 5:
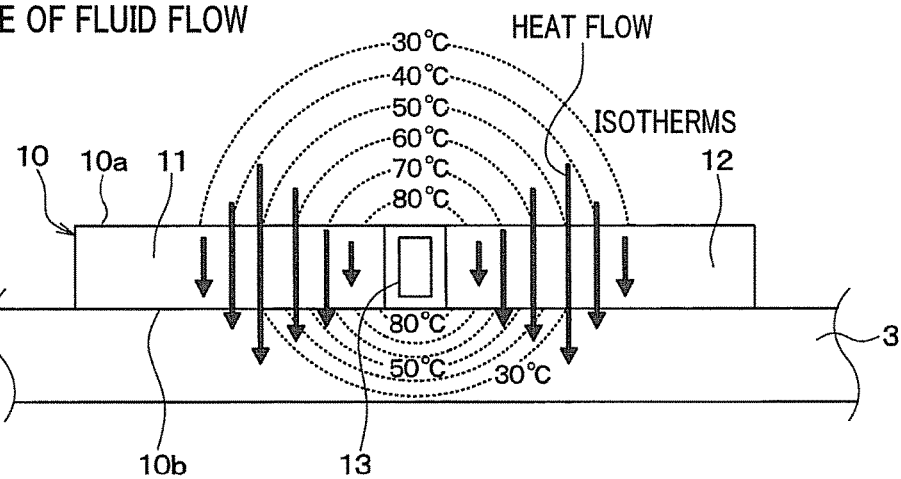
FIG. 5 is a diagram of a temperature distribution near the flow sensor in the absence of a fluid flow in the first embodiment.
Figure 6:
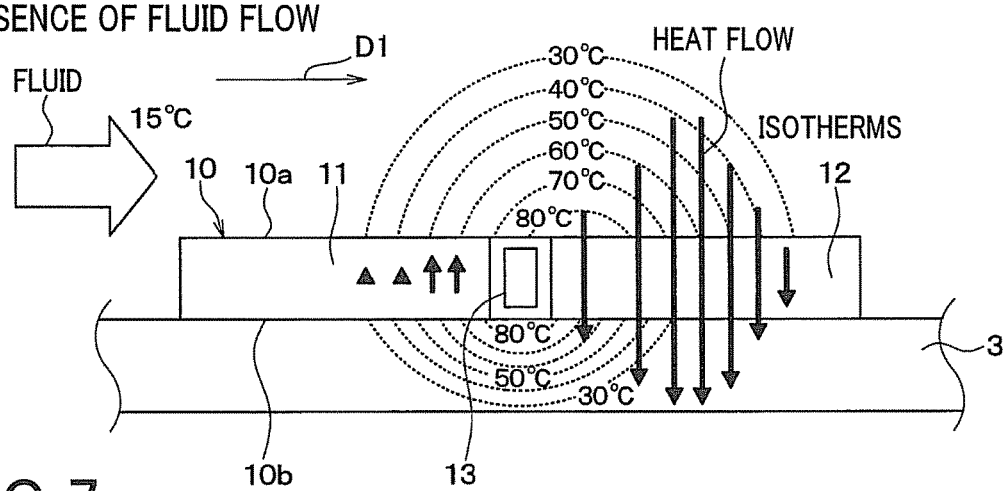
FIG. 6 is a diagram of a temperature distribution near the flow sensor in the presence of a fluid flow in the first embodiment.

Next, referring to FIGS. 5 and 6, a measuring method for the mass flow rate of a fluid by the mass flowmeter 1 according to the present embodiment will be described. FIGS. 5 and 6 are diagrams corresponding to FIG. 2B.

In measuring the mass flow rate of a fluid, the heater part 13 is operated to generate heat. In the following, the state of the flow sensor 10 will be described in a state in the absence of a fluid flow in the inside of the pipe 3 and in a state in the presence of a fluid flow in the inside of the pipe 3. The state in the absence of a fluid flow is a state in which although a fluid is present, the mass flow rate of the fluid is zero, which is a state in which the flow rate of the fluid is not changed. The state in the presence of a fluid flow is a state in which the absolute value of the mass flow rate of a fluid is greater than zero, which is a state in which the flow rate of the fluid is changed compared with the state in which the mass flow rate of the fluid is zero.

As shown in FIG. 5, in the absence of a fluid flow, heat from the heater part 13 is transmitted. Thus, a temperature distribution shown by isotherms in FIG. 5 on the fluid present on the top face 10a side of the flow sensor 10 is formed as well as a temperature distribution shown by isotherms in FIG. 5 is formed on the pipe 3 on the lower face 10b side of the flow sensor 10. The temperature of the top face 10a of the flow sensor 10 becomes a temperature suitable for the temperature distribution of the fluid, and the temperature of the lower face 10b of the flow sensor 10 becomes a temperature suitable for the temperature distribution of the pipe 3.

At this time, heat released from the heater part 13 to the fluid and the pipe 3 is equally conducted to both sides sandwiching the heater part 13. Thus, the temperature distributions of the fluid and the pipe 3 are equal on both sides sandwiching the heater part 13. In the present embodiment, the fluid conducts heat easier than the pipe 3 does. Thus, the temperature distribution of the fluid is different from the temperature distribution of the pipe 3. Specifically, in comparison between temperatures at the locations at the same distance from the heater part 13 to the top face 10a and the lower face 10b of the flow sensor 10, the temperature of the top face 10a on the fluid side is higher than the temperature of the lower face 10b on the pipe 3 side.

Thus, in both of the first and the second sensor parts 11 and 12, the top face 10a is the high temperature side, the lower face 10b is the low temperature side, and the temperature difference between the top face 10a and the lower face 10b is equal. Accordingly, heat flows in the same direction and the same level through the insides of the first and the second sensor parts 11 and 12. Therefore, the electromotive force generated in the first sensor part 11 and the electromotive force generated in the second sensor part 12 are at the same level and have different positive and negative polarities. Thus, the electromotive forces are canceled to each other when combined together, and the total electromotive force outputted from the flow sensor 10 is zero.

As shown in FIG. 6, in the presence of a fluid flow, the temperature distribution of the fluid on the top face 10a side of the flow sensor 10 is changed compared with the state in the absence of a fluid flow. In other words, when a fluid flows along the top face 10a of the flow sensor 10, as shown in the isotherms in FIG. 6, a high temperature portion of the fluid to have a high temperature by heat from the heater part 13 is shifted in the flowing direction D1 of the fluid. In FIG. 6, since the flow direction D1 of the fluid is the rightward direction, a high temperature portion of the fluid at a temperature of 80° C. is shifted to the right side compared with the state in the absence of a fluid flow. Note that the temperature distribution of the pipe 3 located on the lower face 10b side of the flow sensor 10 is not changed, or slightly changed since the fluid does not flow to the lower face 10b side of the flow sensor 10.

Thus, as shown in FIG. 6, in the second sensor part 12 on the downstream side of the fluid flow from the heater part 13, the temperature is high on the top face 10a, and the temperature is low on the lower face 10b is the low side. Downward heat flows expressed by arrows in FIG. 6 pass through the second sensor part 12. The temperature difference between the top face 10a and the lower face 10b is greater than that in the absence of a fluid flow. Therefore, the electromotive force generated in the second sensor part 12 is positive, and the voltage value is greater than that in the absence of a fluid flow.

On the other hand, in the first sensor part 11 on the upstream side of the fluid flow from the heater part 13, the temperature is low on the top face 10a, and the temperature is high on the lower face 10b. Upward heat flows expressed by arrows in FIG. 6 are passed through the first sensor part 11. Therefore, the electromotive force generated in the first sensor part 11 is positive, which is opposite to electromotive force in the absence of a fluid flow.

As a result, the positive total electromotive force combining the electromotive force generated in the first sensor part 11 with the electromotive force generated in the second sensor part 12 is outputted from the flow sensor 10. At this time, on the top face 10a of the multi-layer substrate 10, a certain relationship is observed between the temperatures in the regions of the first and the second sensor parts 11 and 12 and the mass flow rate of the fluid. Thus, a certain relationship is observed between the total electromotive force outputted from the flow sensor 10 and the mass flow rate of the fluid. Therefore, the controller 2 operates the mass flow rate of the fluid based on the level of the total electromotive force outputted from the flow sensor 10 and the relationship between the level of the total electromotive force and the mass flow rate of the fluid. Thus, the mass flow rate of the fluid can be measured. Note that, the relationship between the total electromotive force outputted from the flow sensor 10 and the mass flow rate of the fluid is found in advance by experiment, for example, and the relationship is stored in advance in the memory of the controller 2.

As described above, the flow sensor 10 according to the present embodiment has a structure manufactured by pressurizing and heating the rear face protective member 120, the insulating base material 100, and the front face protective member 110 for integration. The flow sensor 10 is a solid structure with no space. Thus, the flow sensor 10 according to the present embodiment has no large space is present unlike the conventional flow sensor having a space immediately below the diaphragm. Consequently, the flow sensor 10 according to the present embodiment is less breakable than a sensor having a diaphragm structure is. The solid structure referred here means a structure with no space in the absence of a large space like a space immediately below the diaphragm of the conventional flow sensor. However, this does not mean that structures with a small space formed between the components configuring the sensor are excluded.

Figure 7:
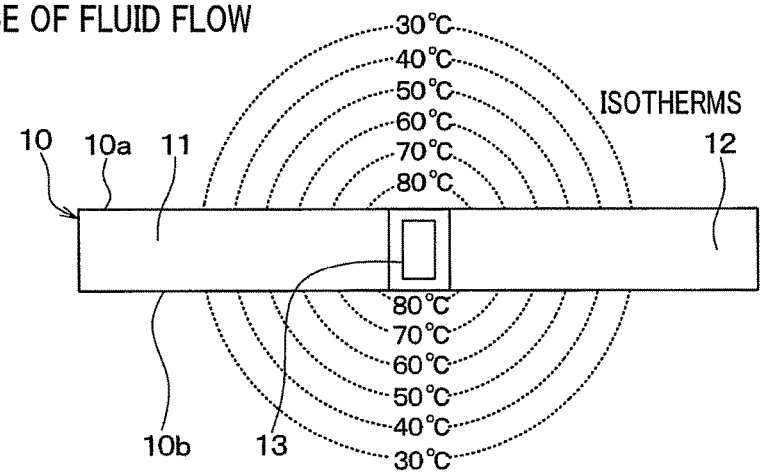
FIG. 7 is a diagram of a temperature distribution near the flow sensor in the absence of a fluid flow in comparative example 1.
Figure 8:
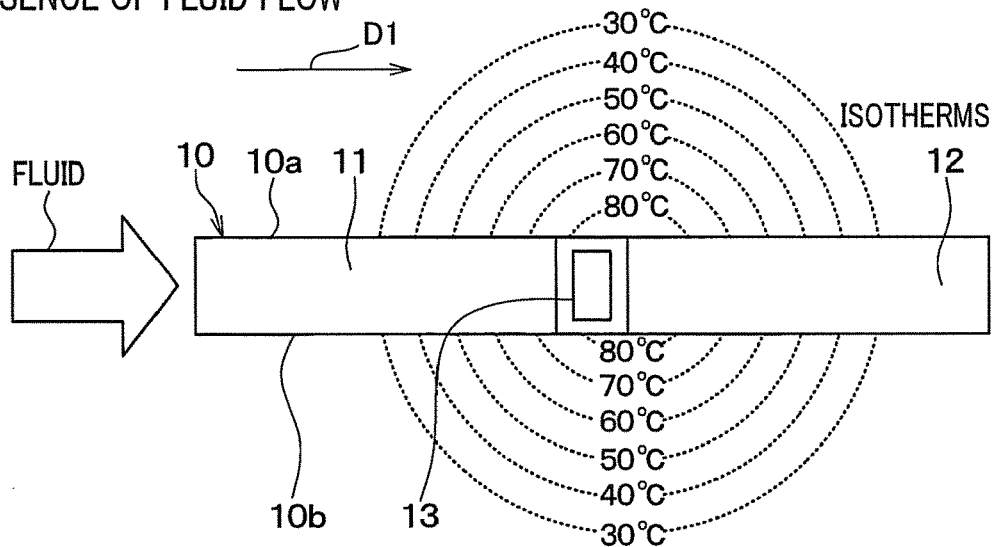
FIG. 8 is a diagram of a temperature distribution near the flow sensor in the presence of a fluid flow in comparative example 1.

Here, the installed state of the flow sensor 10 according to the present embodiment is compared with the installed state of the flow sensor 10 in comparative example 1 shown in FIGS. 7 and 8. In comparative example 1, the above-described flow sensor 10 is installed in the inside of the pipe 3 so that the top face 10a and the lower face 10b of the flow sensor 10 are brought into contact with a fluid flowing in the inside of the pipe 3.

In comparative example 1, in the absence of a fluid flow shown in FIG. 7, the temperature distributions of the fluid on the top face 10a side and the lower face 10b side of the flow sensor 10 are equal as shown by the isotherms in FIG. 7. Thus, in both of the first and the second sensor parts 11 and 12, the temperatures at the locations at the same distance from the heater part 13 to the top face 10a and the lower face 10b are equal, and no heat flow is generated in the insides of the first and the second sensor parts 11 and 12. Consequently, no electromotive force is generated.

In comparative example 1, also in the presence of a fluid flow shown in FIG. 8, a fluid flows over the top face 10a side and the lower face 10b side of the flow sensor 10. Thus, as shown by the isotherms in FIG. 8, the temperature distributions of the fluid on the top face 10a side and the lower face 10b side of the flow sensor 10 are equal. Thus, in both of the first and the second sensor parts 11 and 12, the temperatures at the locations at the same distance from the heater part 13 to the top face 10a and the lower face 10b are equal, and no heat flow is generated in the insides of the first and the second sensor parts 11 and 12. Consequently, no electromotive force is generated. As described above, in the case in which a fluid flows over the top face 10a side and the lower face 10b side of the flow sensor 10, the temperature difference is not changed between the top face 10a and the lower face 10b in the first and the second sensor parts 11 and 12, compared with the state in the absence of a fluid flow. Therefore, in comparative example 1, it is not possible to measure the mass flow rate of the fluid.

In contrast to this, in the present embodiment, the lower face 10b of the flow sensor 10 is attached to the inner surface of the pipe 3 which is more resistant to heat transfer than a fluid targeted for measurement. In other words, in the present embodiment, the flow sensor 10 is installed on the pipe 3 in the state in which the pipe 3 which is more resistant to heat transfer than the fluid is present on the lower face 10b of the flow sensor 10.

Thus, in the presence of a fluid flow, on the top face 10a side of the flow sensor 10, heat from the heater part 13 is moved to the fluid flowing direction caused by the fluid flow, whereas on the lower face 10b side of the flow sensor 10, the movement of heat from the heater part 13 is reduced, compared with the top face 10a side. As a result, in the presence of a fluid flow, the temperature difference between the top face 10a and the lower face 10b can be changed in the first and the second sensor parts 11 and 12, compared with the state in the absence of a fluid flow. As a result, according to the present embodiment, the mass flow rate of the fluid can be measured based on the total of electromotive forces corresponding to the temperature differences between the top face 10a and the lower face 10b in the first and the second sensor parts 11 and 12.

The flow sensor 10 according to the present embodiment has the first and the second sensor parts 11 and 12 on both sides of the heater part 13, in the configuration in which the first and the second sensor parts 11 and 12 have the different polarities of electromotive forces generated by heat flows in the same orientation and the first and the second sensor parts 11 and 12 are electrically connected in series to each other in the inside of the multi-layer substrate.

Here, the flow sensor 10 may be a sensor adopting a configuration including only one of the first and the second sensor parts 11 and 12. In this case also, the temperature difference between the top face and the lower face is changed in both of the first and the second sensor parts 11 and 12 in the presence of a fluid flow compared with that in the absence of a fluid flow (see FIGS. 5 and 6). Thus, the mass flow rate of the fluid can be measured also based on the electromotive force of only one of the first and the second sensor parts 11 and 12.

However, because of the following reason, the flow sensor 10 according to the present embodiment is preferable. In other words, in the flow sensor 10 according to the present embodiment, electromotive forces of the same polarities are generated from the first and the second sensor parts 11 and 12 in the presence of a fluid flow as described above, and the total of these electromotive forces is outputted. Thus, according to the present embodiment, the electromotive force outputted from the flow sensor 10 can be increased, i.e., the sensitivity can be increased compared with a flow sensor in a configuration having only one of the first and the second sensor parts 11 and 12.

Unlike the flow sensor 10 according to the present embodiment, the first and the second sensor parts 11 and 12 may be configured to have the same polarities of electromotive forces generated by heat flows in the same orientation. At this time, the first and the second sensor parts 11 and 12 may be connected in series to each other. Alternatively, the first and the second sensor parts 11 and 12 may be separately electrically connected to the controller 2.

However, in a flow sensor in which the first and the second sensor parts 11 and 12 are configured to have the same polarities of electromotive forces generated by heat flows in the same orientation and are connected in series to each other, the flowing directions of the fluid are the forward direction and the reverse direction, and the polarities of the voltage values outputted from the flow sensor are equal. Thus, in the case in which the flowing direction of the fluid is switched between the forward direction and the reverse direction, it is not possible to identify the flowing direction of the fluid.

In contrast to this, in the flow sensor 10 according to the present embodiment, in the case in which the flowing direction of the fluid is switched between the forward direction and the reverse direction, the polarities of the voltage values outputted from the flow sensor 10 are different. Thus, it is possible to identify whether the flowing direction of the fluid is the forward direction or the reverse direction from the polarities of the voltage values outputted.

Unlike the flow sensor 10 according to the present embodiment, in the case in which the flow sensor is configured to have only one of the first and the second sensor parts 11 and 12, or in the case in which the first and the second sensor parts 11 and 12 are configured to have the same polarities of electromotive forces generated by heat flows in the same orientation, a problem arises in that it is not possible to cancel a change in the heat flow caused by a temperature change in the ambient environment. For example, when the temperature in the inside of the pipe 3 rises because of direct sunlight, even in the absence of a fluid flow, the heat flows passed through the flow sensor are changed, causing a change in the electromotive force outputted from the flow sensor. Thus, errors occur in the measured result of the mass flow rate of the fluid.

In contrast to this, in the flow sensor 10 according to the present embodiment, even though a temperature change in the ambient environment causes a change in the heat flows passed through the first and the second sensor parts 11 and 12, the changes are equal. Thus, the combination of the electromotive forces generated in the first and the second sensor parts 11 and 12 can cancel a change in the heat flow. Consequently, the accuracy of the measured result of the mass flow rate of the fluid can be enhanced.

The flow sensor 10 according to the present embodiment being less breakable than the conventional flow sensor is can also be described as below.

The conventional flow sensor detects a temperature change in the front face of the diaphragm caused by heat transfer accompanying a fluid flow using a sensor resistor. Thus, in order to reduce the influence of the heat capacity of the diaphragm applied to the sensor resistor, the diaphragm is decreased in thickness as much as possible. In other words, when heat transfer accompanying a fluid flow occurs, the configuration, in which the temperature of the entire diaphragm, i.e. the temperatures of the one face and the other face of the diaphragm are equal, can highly sensitively detect a temperature change in the front face of the diaphragm caused by heat transfer accompanying a fluid flow.

On the other hand, the flow sensor 10 according to the present embodiment detects a change in the heat flow flowing in the thickness direction of the substrate caused by heat transfer accompanying the fluid flow using the first and the second thermoelectric conversion elements 11 and 12. At this time, when the top face and the lower face of the substrate have the same temperature, no heat flow flowing in the thickness direction of the substrate is generated. Thus, in the flow sensor 10 according to the present embodiment, it is unnecessary to decrease the thickness of the substrate unlike the diaphragm of the conventional flow sensor. Note that, the substrate referred here means the plate-shaped flow sensor 10 itself having one face and the other face on the opposite side of the one face.

Therefore, the flow sensor 10 according to the present embodiment has a structure having neither a thin diaphragm nor a large space immediately below the diaphragm unlike the conventional flow sensor, and is less breakable than the conventional flow sensor is.

(Second Embodiment)

In the present embodiment, a method of installing the flow sensor 10 on the pipe 3 is changed from the first embodiment.

Figure 9:
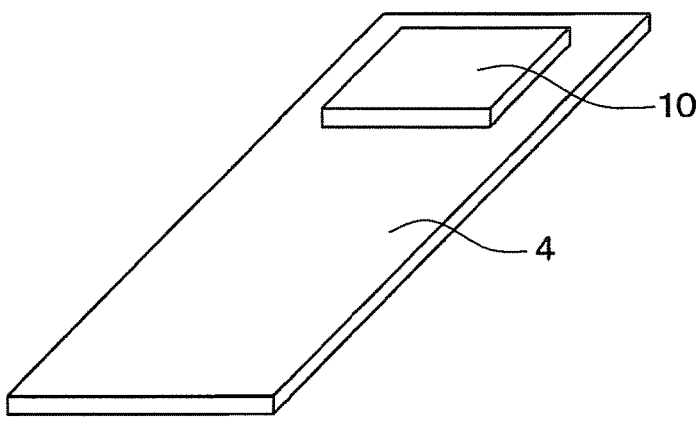
FIG. 9 is a perspective view for explaining a method of installing a flow sensor at a measurement location according to a second embodiment.

As shown in FIG. 9, a flow sensor 10 is installed in a pipe 3 and is placed on the front face of a flat rigid body 4. The lower face of the flow sensor 10 is attached to the top face of the rigid body 4 via an adhesive layer, not shown. The rigid body 4 is fixed to the pipe 3 by a fixing means, not shown.

The rigid body 4 has rigidity higher than the rigidity of the flow sensor 10, and is a support member for supporting the flow sensor 10. The rigid body 4 is a member more resistant to heat transfer than a fluid. Therefore, the rigid body 4 is formed of a resin, for example, having rigidity higher than the rigidity of the flow sensor 10 and more resistant to heat transfer than a fluid. The size of the rigid body 4 is greater than the size of the flow sensor 10 in the surface direction.

Also in the present embodiment, the lower face of the flow sensor 10 is provided with the rigid body 4 which is more resistant to heat transfer than a fluid targeted for measurement. Thus, similarly to the first embodiment, in comparison between the states in the presence of a flow rate and the absence of a fluid flow, the temperature difference between a top face 10a and a lower face 10b can be changed in first and second sensor parts 11 and 12, and the mass flow rate of the fluid can be measured.

Under the conditions in which the pipe 3 is formed of a material, such as a metal, that easily transfers heat, the temperature difference between the top face 10a and the lower face 10b is reduced in the first and the second sensor parts 11 and 12 when the flow sensor 10 is directly attached to the inner surface of the pipe 3. According to the present embodiment, such a problem can be eliminated.

(Third Embodiment)

In the present embodiment, a method of installing the flow sensor 10 on the pipe 3 is changed from the first embodiment.

Figure 10:
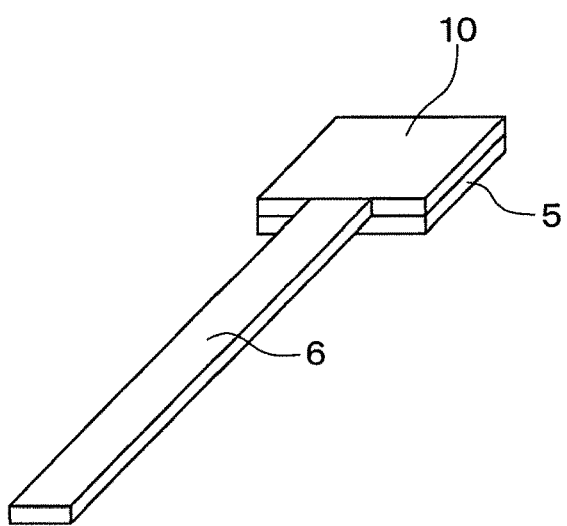
FIG. 10 is a perspective view for explaining a method of installing a flow sensor on a measurement location according to a third embodiment.

As shown in FIG. 10, in a flow sensor 10, a flat plate 5 is attached to the lower face of the flow sensor 10, and a bar-shaped rigid body 6 is attached to the side surface of the flow sensor 10. The flow sensor 10 is installed in the pipe 3 and is supported by the rigid body 6. The flat plate 5 and the rigid body 6 are attached to the flow sensor 10 via an adhesive layer, not shown. The rigid body 6 is fixed to the pipe 3 by a fixing means, not shown.

The flat plate 5 is a member more resistant to heat transfer than a fluid, and is formed of a resin, for example. Similarly to the rigid body 4 of the second embodiment, the rigid body 6 has rigidity higher than the rigidity of the flow sensor 10, and is a support member for supporting the flow sensor 10.

Also in the present embodiment, the flat plate 5 more resistant to heat transfer than a fluid targeted for measurement is provided on the lower face of the flow sensor 10. Thus, similarly to the first embodiment, in comparison between the states in the presence of a flow rate and the absence of a fluid flow, the temperature difference between the top face 10a and the lower face 10b can be changed in the first and the second sensor parts 11 and 12, and the mass flow rate of the fluid can be measured.

(Fourth Embodiment)

In the present embodiment, a method of installing the flow sensor 10 on the pipe 3 is changed from the first embodiment.

Figure 11A:
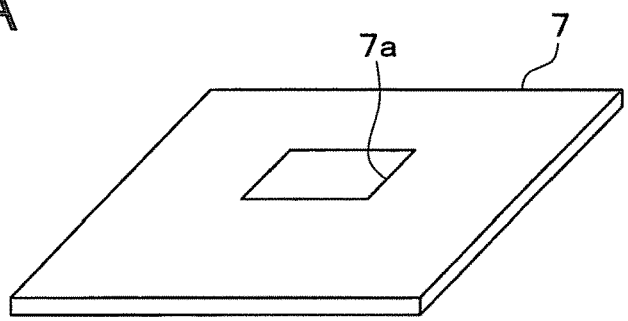
FIG. 11A is a perspective view for explaining a method of installing a flow sensor on a measurement location according to a fourth embodiment.
Figure 11B:
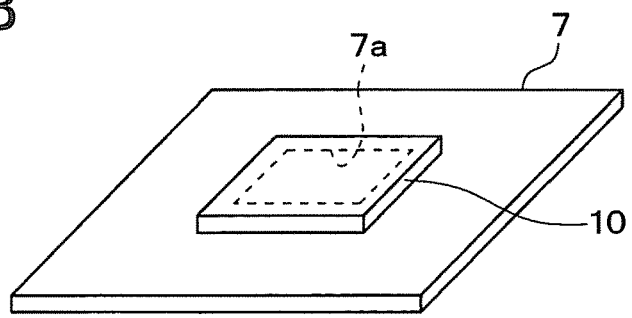
FIG. 11B is a perspective view for explaining a method of installing a flow sensor on a measurement location according to the fourth embodiment.

In the present embodiment, as shown in FIGS. 11A and 11B, a flow sensor 10 is disposed on the front face of a sheet-like elastic body 7 having an opening 7a. At this time, a part of the flow sensor 10 is opposed to the opening 7a. The elastic body 7 is an elastically deformable body, and is formed of a resin such as PET. The elastic body 7 is formed thin for excellent heat conduction.

Figure 11C:
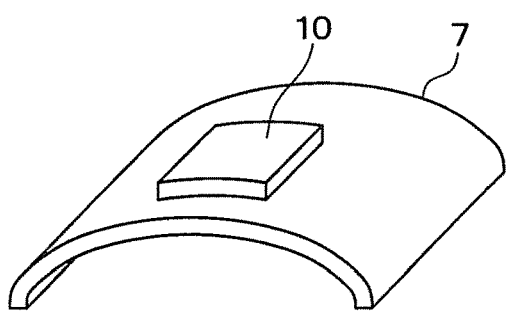
FIG. 11C is a perspective view for explaining a method of installing a flow sensor on a measurement location according to the fourth embodiment.
Figure 11D:
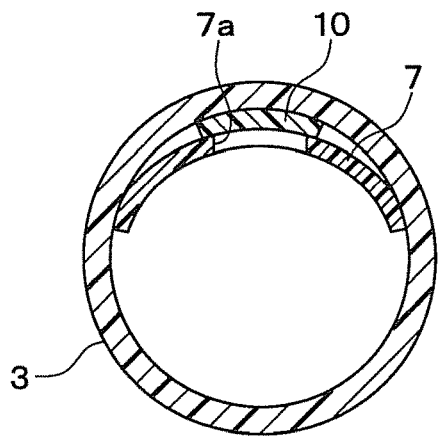
FIG. 11D is a perspective view for explaining a method of installing a flow sensor on a measurement location according to the fourth embodiment.
Figure 12:
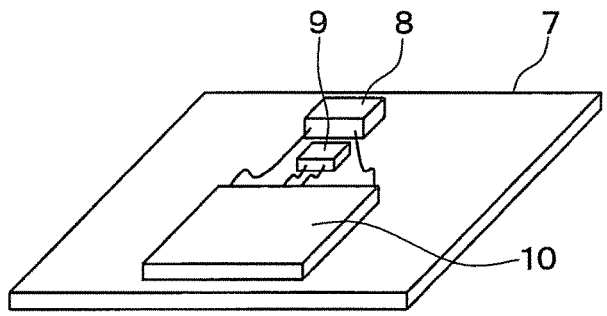
FIG. 12 is a perspective view for explaining a method of installing a flow sensor on a measurement location according to a fifth embodiment.

As shown in FIGS. 11C and 11D, the flow sensor 10 and the sheet-like elastic body 7 are installed in the pipe 3 and are bent along the inner surface of the pipe 3 with the face on which the flow sensor 10 is mounted facing the inner surface of the pipe 3.

Here, the elastic body 7 has a length in the width direction, which corresponds to the inner circumferential direction of the pipe 3, longer than the diameter of the pipe 3. Thus, the elastic body 7 is fixed to the inner surface of the pipe 3 by the restoring force of the elastic body 7 returning from the bent state to a flat state. Accordingly, the lower face of the flow sensor 10 (see FIG. 2B) is brought into contact with the inner surface of the pipe 3, and the flow sensor 10 is fixed to the pipe 3 by the elastic body 7. Therefore, according to the present embodiment, the flow sensor 10 can be firmly fixed to the pipe 3, allowing the elimination of processing the pipe 3 for fixing the flow sensor 10 to the pipe 3.

According to the present embodiment, the flow sensor 10 is exposed from the opening 7*a*. Thus, the flow sensor 10 can be brought into contact with the fluid. Accordingly, the degradation of the sensitivity of the flow sensor 10 due to being covered by the elastic body 7 can be prevented.

(Fifth Embodiment)

In the present embodiment, a wireless unit 8 and a thermoelectric conversion module 9 in addition to a flow sensor 10 are disposed on the front face of the sheet-like elastic body 7 described in the fourth embodiment. The flow sensor 10 together with the wireless unit 8 and the thermoelectric conversion module 9 is installed in a pipe 3.

The wireless unit 8 is a radio transmitting means for radio transmission of sensor signals outputted from the flow sensor 10 to a controller 2, and includes a transmitter, for example, for radio transmission.

The thermoelectric conversion module 9 is a power supply means for supplying electric power generated by the temperature difference between a fluid flowing in the inside of the pipe 3 and the pipe 3 to a heater part 13 of the flow sensor 10. The thermoelectric conversion module 9 is a module having a plurality of thermoelectric conversion elements connected in series to each other. The thermoelectric conversion module 9 may be a module which has the same structure as the first and the second sensor parts 11 and 12 of the flow sensor 10.

In the case in which the flow sensor 10 installed in the pipe 3 is connected by wires to the controller 2 located external to the pipe 3, it is necessary to form a hole for installing wires, for example, on the pipe 3 in order to lead wires from the inside of the pipe 3.

In contrast to this, according to the present embodiment, the sensor signals of the flow sensor 10 are outputted to the controller 2 by radio transmission, and electric power is supplied from the thermoelectric conversion module 9 installed in the inside of the pipe 3 to the heater part 13. Thus, it is unnecessary to lead wires from the inside of the pipe 3 to the outside, and it is unnecessary to form the hole for installing wires on the pipe 3.

(Sixth Embodiment)

In the present embodiment, the position of the heater part 13 is changed from the flow sensor 10 according to the first embodiment. In the first embodiment, the heater part 13 is located in the center part in the direction perpendicular to the top face 10*a* and the lower face 10*b* of the multi-layer substrate 10. However, in the present embodiment, a heater part 13 is located on a top face 10*a* of a multi-layer substrate 10.

Figure 13:
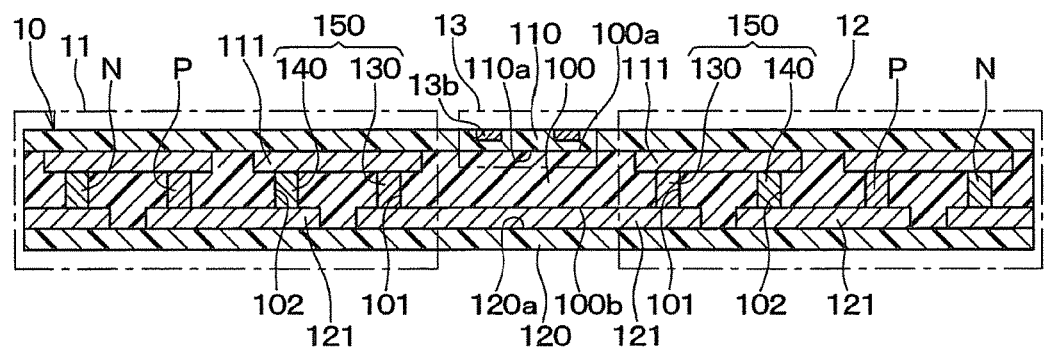
FIG. 13 is a cross-sectional view of a flow sensor according to a sixth embodiment.

In other words, as shown in FIG. 13, in the present embodiment, the heater part 13 is configured of a resistance element 13*b* that generates heat by carrying electricity. The resistance element 13*b* is provided on a front face protective member 110. The resistance element 13*b* is exposed from the front face protective member 110.

(Seventh Embodiment)

Figure 14:
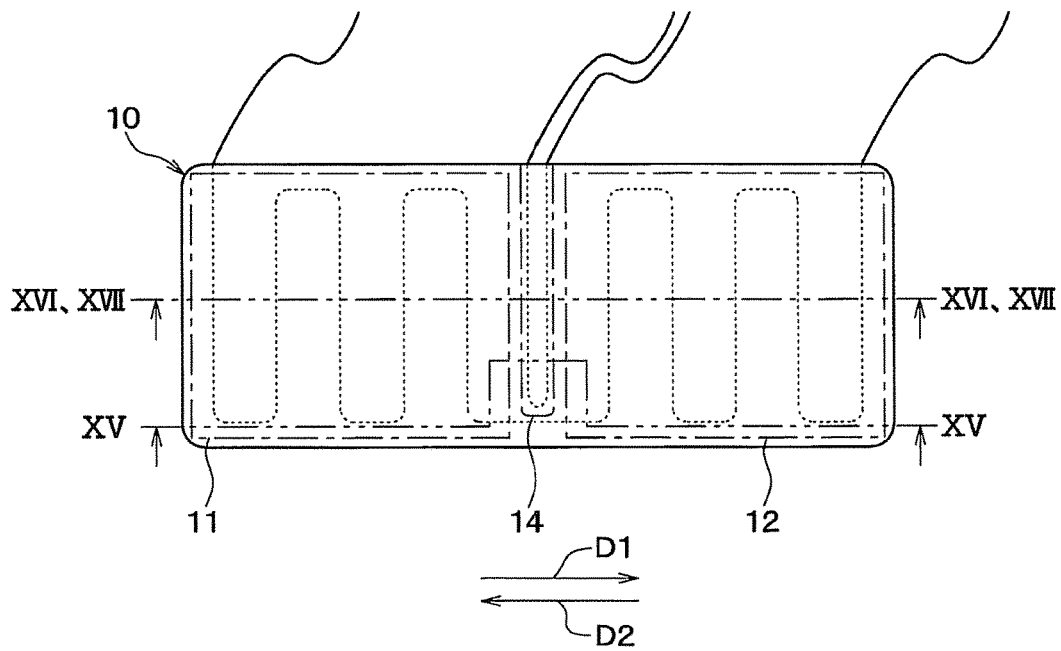
FIG. 14 is a plan view of a flow sensor according to a seventh embodiment.

As shown in FIG. 14, in the present embodiment, the heater part 13 is replaced with a Peltier element part 14 in the flow sensor 10 according to the first embodiment. The Peltier element part 14 is a heat source that generates both heat and cold. The Peltier element part 14 is formed on one multi-layer substrate 10 together with first and the second sensor parts 11 and 12.

Figure 15:
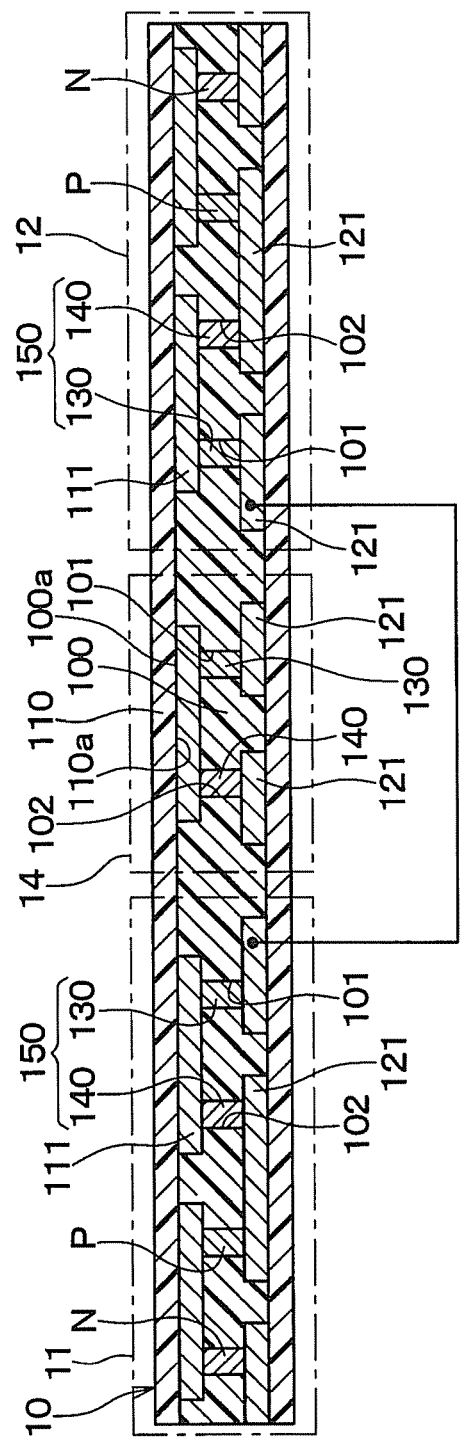
FIG. 15 is a cross-sectional view taken along line XV-XV in FIG. 14.

As shown in FIG. 15, the Peltier element part 14 has a structure the same as the structure of the first sensor part 11. In other words, the Peltier element part 14 is formed with the first and the second interlayer connecting members 130 and 140 connected to each other. The first and the second interlayer connecting members 130 and 140 connected to each other configure the Peltier element. When electric power is supplied to the first and the second interlayer connecting members 130 and 140 connected to each other, as shown in FIG. 16, the top face 10*a* side of the multi-layer substrate 10 generates heat, and the lower face 10*b* side of the multi-layer substrate 10 absorbs heat.

The flow sensor 10 according to the present embodiment is manufactured by changing the manufacturing method for the flow sensor 10 described in the first embodiment, in which a component having a structure the same as the structure of the first sensor part 11 and electrically isolated from the first sensor part 11 is formed on the region of the multi-layer substrate 10 to be the Peltier element part 14.

The flow sensor 10 according to the present embodiment is installed in the inside of the pipe 3 so that the top face 10*a* and the lower face 10*b* of the flow sensor 10 are in contact with a fluid flowing in the inside of the pipe 3. For example, the rigid body 6 shown in FIG. 10 is installed in the inside of the pipe 3 being attached to the side surface of the flow sensor 10. At this time, the flat plate 5 shown in FIG. 10 is not attached to the lower face 10*b* of the flow sensor 10.

Figure 16:
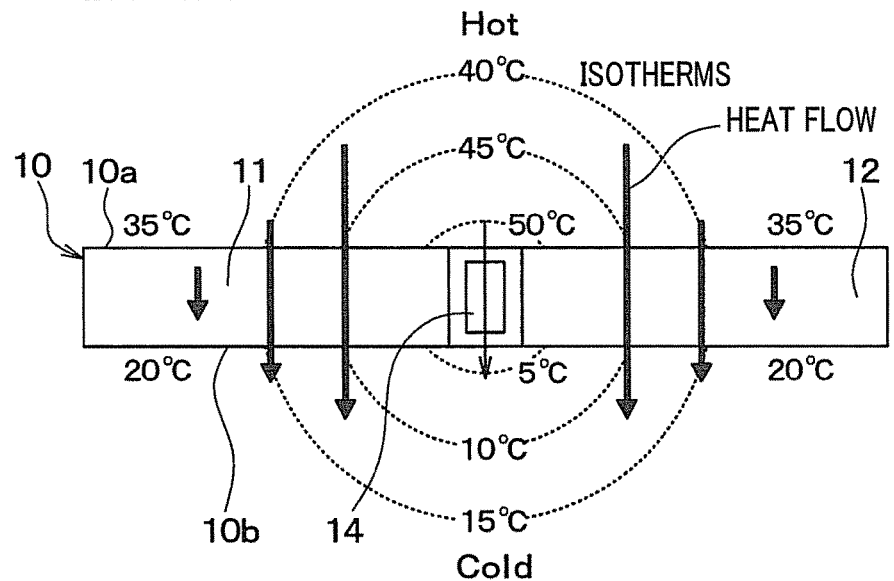
FIG. 16 is a diagram of a temperature distribution near the flow sensor in the absence of a fluid flow in the seventh embodiment and is a schematic diagram corresponding to a cross section taken along line XVI-XVI in FIG. 14.

As shown in FIG. 16, in measuring the mass flow rate of a fluid, the Peltier element part 14 is operated to release heat to the fluid on the top face 10*a* side of the flow sensor 10 as well as cold heat is released to the fluid on the lower face of the flow sensor 10 16*b* side.

In the absence of a fluid flow, as shown in the isotherms in FIG. 16, in the fluid on the top face 10*a* side of the flow sensor 10, a temperature distribution is formed in which the temperature is higher in the area closer to the Peltier element part 14. In the fluid on the top face 10*a* side of the flow sensor 10, a temperature distribution is formed in which the temperature is lower in the area closer to the Peltier element part 14.

At this time, to the fluids on the top face 10*a* side and the lower face 10*b* side, heat released from the Peltier element part 14 is equally conducted to both sides sandwiching the heater part 13. Thus, the temperature distributions of the fluid on the top face 10*a* side and the lower face 10*b* side are equal on both sides sandwiching the Peltier element part 14.

Thus, in both of the first and the second sensor parts 11 and 12, the top face 10*a* is the high temperature side, the lower face 10*b* is the low temperature side, and the temperature difference between the top face 10*a* and the lower face 10*b* is equal. Consequently, heat flows in the same orientation and the same level are carried through the insides of the first and the second sensor parts 11 and 12. Therefore, the electromotive force generated in the first sensor part 11 and the electromotive force generated in the second sensor part 12 are at the same level and have different positive and negative polarities. Thus, the electromotive forces cancel each other when combined together, and the electromotive force outputted from the flow sensor 10 is zero.

Figure 17:
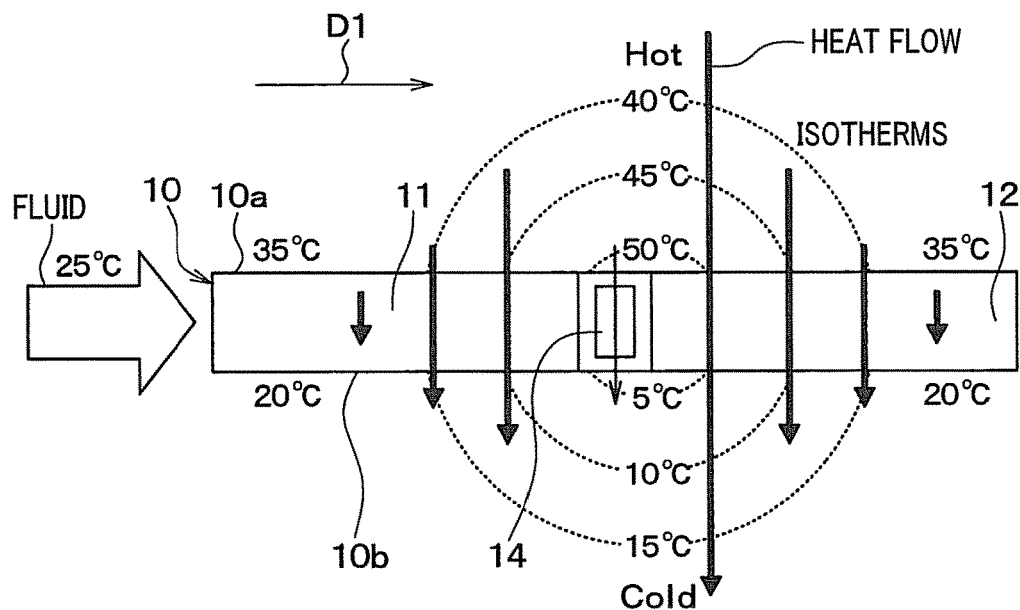
FIG. 17 is a diagram of a temperature distribution near the flow sensor in the presence of a fluid flow in the seventh embodiment and is a schematic diagram corresponding to a cross section taken along line XVII-XVII in FIG. 14.

As shown in FIG. 17, in the presence of a fluid flow, the temperature distributions of the fluids on the top face 10a side of the flow sensor 10 and the lower face 10b side are changed compared with the state in the absence of a fluid flow. In other words, as shown in the isotherms in FIG. 17, compared with the state in the absence of a fluid flow, a high temperature portion at a temperature of 50° C. in the fluid on the top face 10a side of the flow sensor 10 is shifted in the flowing direction D1 of the fluid, and a low temperature portion at a temperature of 5° C. in the fluid on the lower face 10b side of the flow sensor 10 is shifted in the flowing direction D1 of the fluid.

Thus, in the second sensor part 12 on the downstream side of the fluid flow from the Peltier element part 14, compared with the state in the absence of a fluid flow, the region in which the temperature difference between the top face 10a and the lower face 10b is a temperature of 45° C. is increased, and the mean value of the temperature difference between the top face 10a and the lower face 10b in the entire second sensor part 12 is increased. In other words, as indicated by arrows in FIG. 17, the level of a heat flow passed through the second sensor part 12 is increased compared with the state in the absence of a fluid flow. Therefore, the electromotive force generated in the second sensor part 12 is positive, and the voltage value is greater than that in the absence of a fluid flow.

On the other hand, in the first sensor part 11 on the upstream side of the fluid flow from the Peltier element part 14, compared with the state in the absence of a fluid flow, the region in which the temperature difference between the top face 10a and the lower face 10b is a temperature of 45° C. is decreased, and the mean value of the temperature difference between the top face 10a and the lower face 10b in the entire second sensor part 12 is decreased. Therefore, the electromotive force generated in the second sensor part 12 is negative, and the absolute value of the voltage value is smaller than that in the absence of a fluid flow.

As a result, the positive electromotive force combining the electromotive force generated in the first sensor part 11 with the electromotive force generated in the second sensor part 12 is outputted from the flow sensor 10.

As described above, according to the present embodiment, with the use of the Peltier element part 14, when the flow rate of a fluid is changed, the temperature difference between the top face 10a and the lower face 10b of the flow sensor 10 can be changed on the upstream side of the fluid flow and the downstream side of the Peltier element part 14. Thus, as in the first to the fourth embodiments, the mass flow rate of the fluid can be measured without contacting the member resistant to heat transfer with the lower face 10b of the flow sensor 10. Note that, as in the first to fourth embodiments, also in the present embodiment, the flow sensor 10 may be installed at the measurement location with the member resistant to heat transfer being in contact with the lower face 10b of the flow sensor 10.

As shown in FIG. 17, according to the present embodiment, immediately after the fluid starts to flow, a high temperature portion at a temperature of 50° C. in the fluid on the top face 10a side of the flow sensor 10 is shifted to the flowing direction D1 of the fluid, and a low temperature portion at a temperature of 5° C. in the fluid on the lower face 10b side of the flow sensor 10 is shifted to the flowing direction D1 of the fluid. Thus, the mass flow rate of the fluid can be measured immediately after the fluid starts to flow.

(Eighth Embodiment)

In the present embodiment, the structure of the flow sensor is changed from the first embodiment. As shown in FIGS. 18, 19, 20A, and 21A, in a flow sensor 20 according to the present embodiment, one end portion and the other end portion of a thermoelectric conversion element formed on a multi-layer substrate are disposed on both sides of a heater part 240 in the direction parallel to the front face of the multi-layer substrate.

Figure 20A:
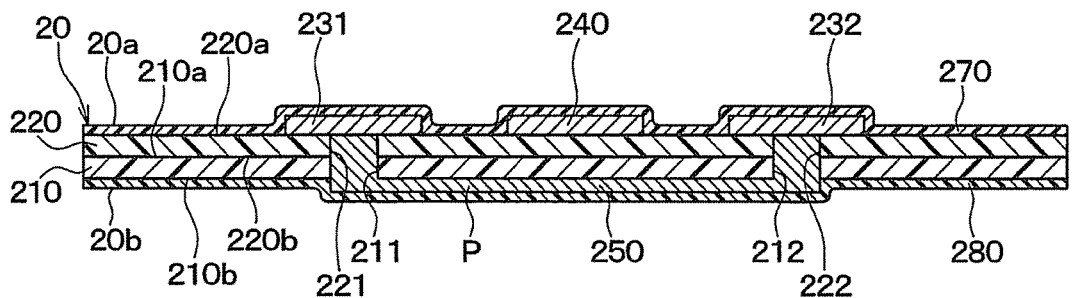
FIG. 20A is a cross-sectional view taken along line XXA-XXA in FIG. 18.
Figure 21A:
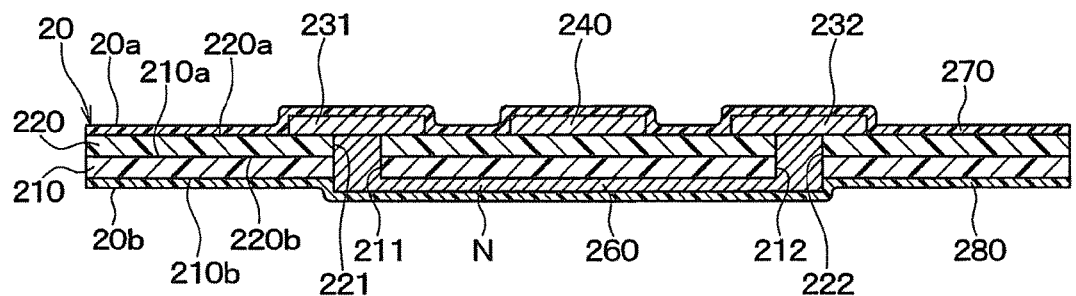
FIG. 21A is a cross-sectional view taken along line XXIA-XXIA in FIG. 18.

Specifically, as shown in FIGS. 20A and 21A, the flow sensor 20 is configured of a multi-layer substrate including an integrated stack of a first insulating layer 210, a second insulating layer 220 disposed on a front face 210a of the first insulating layer 210, a front face protective film layer 270 disposed on a front face 220a of the second insulating layer 220, and a rear face protective film layer 280 disposed on a rear face 210b of the first insulating layer 210. Similarly to the insulating base material 100, the front face protective member 110, and the rear face protective member 120 according to the first embodiment, the first insulating layer 210, the second insulating layer 220, the front face protective film layer 270, and the rear face protective film layer 280 are formed of thermoplastic resin films.

On the front face 220a of the second insulating layer 220, a first connecting pattern 231, the heater part 240, and a second connecting pattern 232 are disposed. The first and the second connecting patterns 231 and 232 are formed being patterned on a film-like conductor, such as copper foil. The heater part 240 is a heat source that releases heat, and is configured of a heating element, thin film resistance element, or the like.

Figure 18:
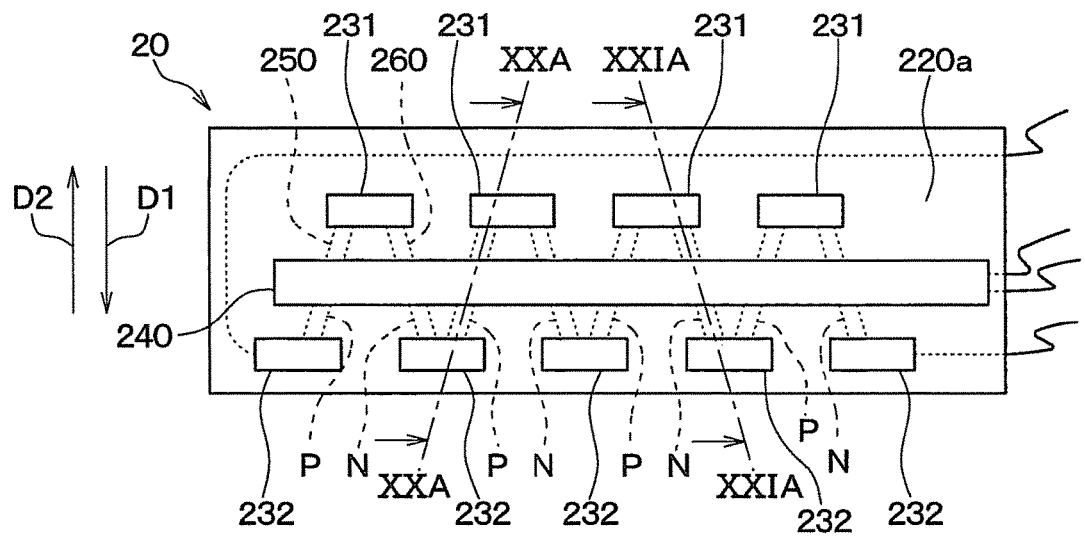
FIG. 18 is a plan view of a flow sensor according to an eighth embodiment.

As shown in FIG. 18, the heater part 240 is in a shape extending in one direction. The first connecting pattern 231 is disposed on one side of regions sandwiching the heater part 240, i.e., on the upper side in FIG. 18. A plurality of first connecting patterns 231 is disposed apart from each other along the longitudinal direction of the heater part 240. Similarly, the second connecting pattern 232 is disposed on the other side of the regions sandwiching the heater part 240, i.e., on the lower side in FIG. 18. A plurality of second connecting patterns 232 is disposed apart from each other along the longitudinal direction of the heater part 240. In the present embodiment, the distance from the heater part 240 to the first connecting pattern 231 is equal to the distance from the heater part 240 to the second connecting pattern 232 in the direction perpendicular to the longitudinal direction of the heater part 240.

As shown in FIGS. 20A and 21A, on the rear face 210b of the first insulating layer 210, a thin film-like p-type element 250 and a thin film-like n-type element 260 are formed. The p-type element 250 and the n-type element 260 correspond to the first and the second interlayer connecting members 130 and 140, respectively, described in the first embodiment.

Figure 19:
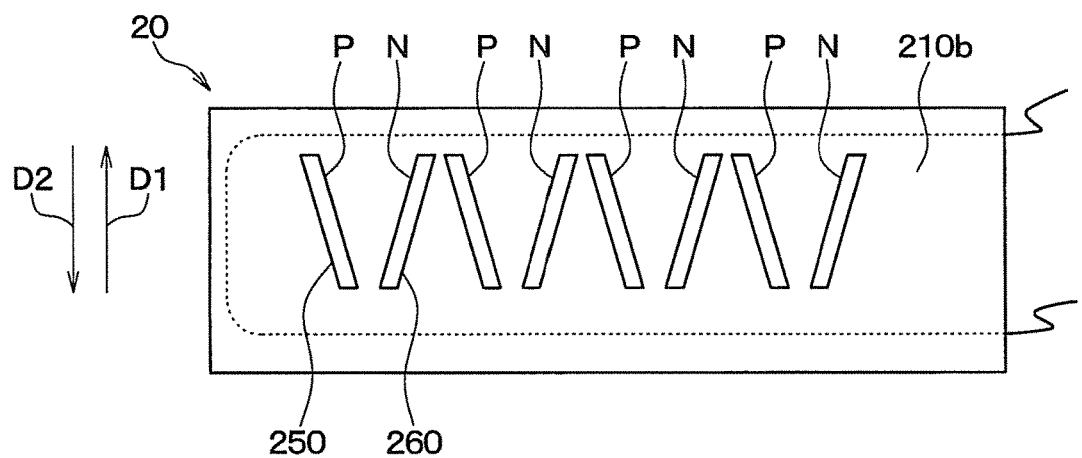
FIG. 19 is a bottom view of the flow sensor according to the eighth embodiment.

As shown in FIGS. 18 and 19, one p-type element 250 and one n-type element 260 are in a shape extending from one end side to the other end side so that the one end portions and the other end portions of the elements 250 and 260 are located on the regions sandwiching the heater part 240. FIG. 19 is a plan view of the rear side of the multi-layer substrate, showing the multi-layer substrate in FIG. 18 upside down. The plurality of p-type elements 250 and the plurality of n-type elements 260 are alternately disposed along the longitudinal direction of the heater part 240.

The one end portions of one p-type element 250 and one n-type element 260 adjacent to each other are both connected to the shared first connecting pattern 231. Thus, one p-type element 250 is connected to one n-type element 260. One p-type element 250 and one n-type element 260 that are adjacent to each other and are not connected to the shared first connecting pattern 231 have the other end portions connected to the shared second connecting pattern 232. Thus, the p-type element 250 and the n-type element 260 connected to each other are combined as one set, and a plurality of sets of the p-type elements 250 and the n-type elements 260 is connected in series to each other. In the present embodiment, in one set of the p-type element 250 and the n-type element 260 connected to each other configures one thermoelectric conversion element. Therefore, the flow sensor 20 includes a plurality of thermoelectric conversion elements connected in series to each other.

As shown in FIG. 20A, one p-type element 250 is connected to the first connecting pattern 231 through vias 211 and 221 formed in the first and the second insulating layers 210 and 220 immediately below the first connecting pattern 231. Similarly, one p-type element 250 is connected to the second connecting pattern 232 through the vias 212 and 222 formed in the first and the second insulating layers 210 and 220 immediately below the second connecting pattern 232.

As shown in FIG. 21A, one n-type element 260 is connected to the first connecting pattern 231 through the vias 211 and 221 formed immediately below the first connecting pattern 231 in the first and the second insulating layers 210 and 220. Similarly, one n-type element 260 is connected to the second connecting pattern 232 through the vias 212 and 222 formed immediately below the second connecting pattern 232 in the first and the second insulating layers 210 and 220.

The basic configuration of the flow sensor 20 according to the present embodiment is described above. In this flow sensor 20, the one end portions of the p-type element 250 and the n-type element 260 connected to each other are disposed on one of the regions sandwiching the heater part 240 apart from the heater part 240. The other end portions of the p-type element 250 and the n-type element 260 connected to each other are disposed on the other side of the regions sandwiching the heater part 240 apart from the heater part 240. Thus, when the temperature difference is generated on both of the regions sandwiching the heater part 240 of the flow sensor 20, electromotive force corresponding to the temperature difference is generated in the p-type element 250 and the n-type element 260 connected to each other.

Next, a manufacturing method for the flow sensor 20 according to the present embodiment will be described.

Figure 20B:
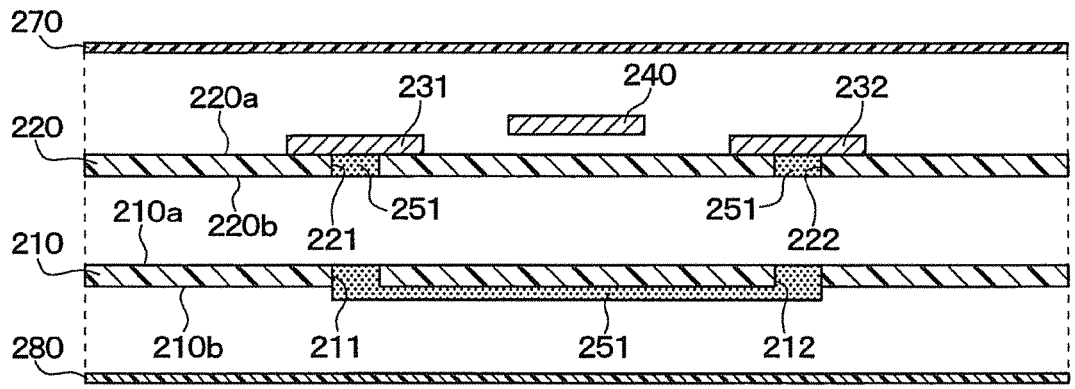
FIG. 20B is a cross-sectional view for explaining the manufacturing process steps of the flow sensor according to the eighth embodiment and is a cross-sectional view corresponding to FIG. 20A.
Figure 21B:
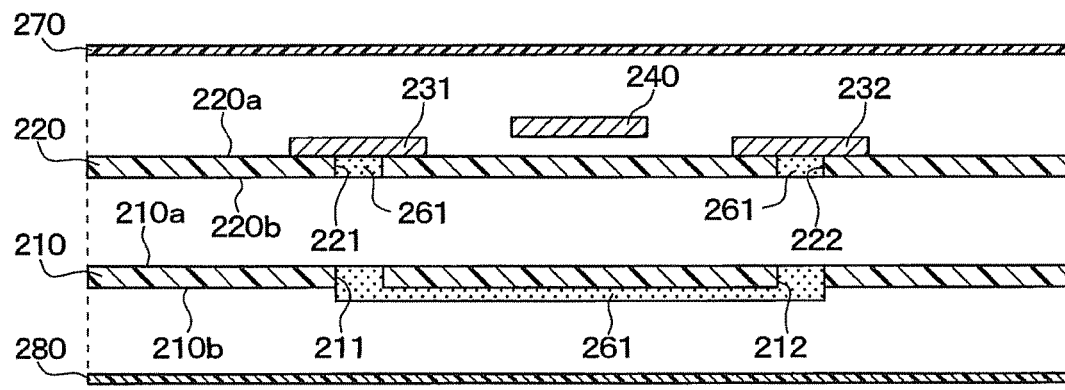
FIG. 21B is a cross-sectional view for explaining the manufacturing process steps of the flow sensor according to the eighth embodiment and is a cross-sectional view corresponding to FIG. 21A.

As shown in FIGS. 20B and 21B, the first insulating layer 210 formed with the patterns of a p-type element material 251 and an n-type element material 261, the second insulating layer 220 having the p-type element material 251 and the n-type element material 261 filled in the vias 221 and 222, the front face protective film layer 270, and the rear face protective film layer 280 are prepared. The p-type element material 251 and the n-type element material 261 correspond to the first conductive paste 131 and the second conductive paste 141, respectively, described in the first embodiment.

Similarly to the first embodiment, the rear face protective film layer 280, the first insulating layer 210, the second insulating layer 220, and the front face protective film layer 270 are in turn stacked in this order to form a laminate. This laminate is pressurized being heated, and then the laminate is integrated. At this time, the p-type element material 251 and the n-type element material 261 are solid-phase sintered by heating in the integration of the laminate, and the p-type element 250 and the n-type element 260 are formed. As described above, the above-described flow sensor 20 is manufactured.

Next, referring to FIGS. 22 and 23, a measuring method for the mass flow rate of a fluid using the flow sensor 20 according to the present embodiment will be described. Note that FIGS. 22 and 23 are diagrams corresponding to FIG. 20A, and the front face protective film layer 270 and the rear face protective film layer 280 in FIG. 20A are omitted.

The flow sensor 20 is installed in the inside of the pipe 3 so that for example, the top face 20a and the lower face 20b are both in contact with a fluid flowing in the inside of the pipe 3. As a method of installing the flow sensor 20, the installing method described in the seventh embodiment can be adopted. In the state in which the flow sensor 20 is installed in this manner, the temperature of the first connecting pattern 231 is almost the same as the temperature of a fluid in contact with the region corresponding to the first connecting pattern 231 on the top face 20a and the lower face 20b of the flow sensor 20. Similarly, the temperature of the second connecting pattern 232 is almost the same as the temperature of a fluid in contact with the region corresponding to the second connecting pattern 232 on the top face 20a and the lower face 20b of the flow sensor 20.

Figure 22:
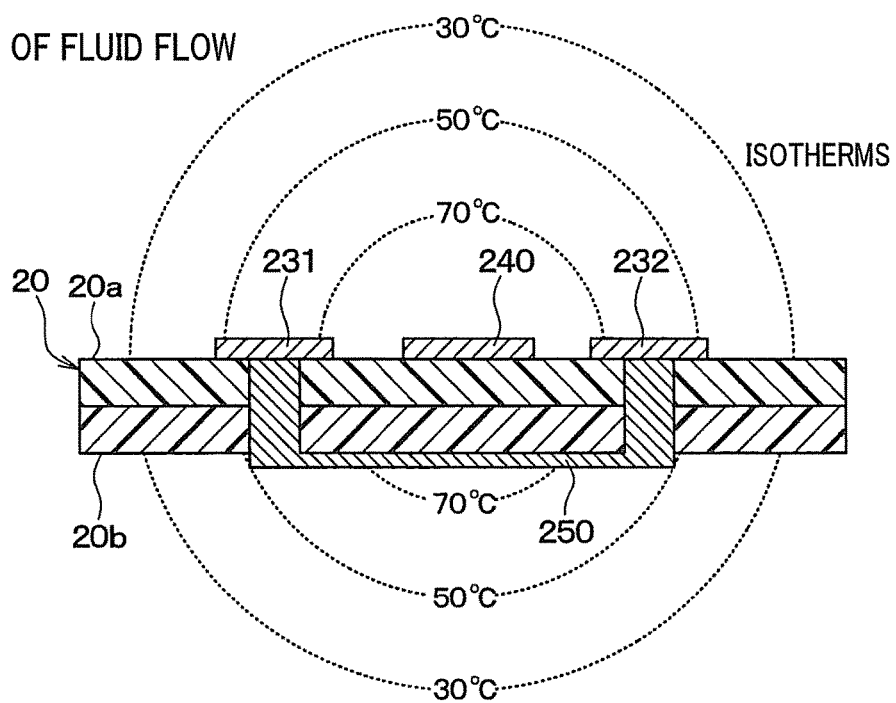
FIG. 22 is a diagram of a temperature distribution near the flow sensor in the absence of a fluid flow in the eighth embodiment.
Figure 23:
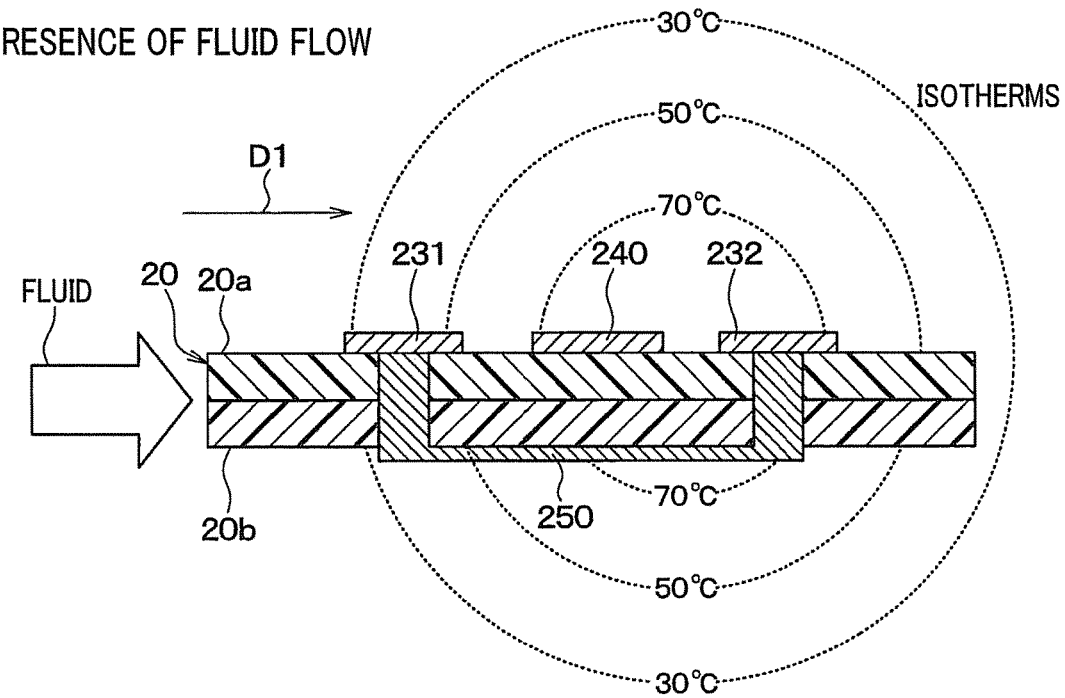
FIG. 23 is a diagram of a temperature distribution near the flow sensor in the presence of a fluid flow in the eighth embodiment.
Figure 24:
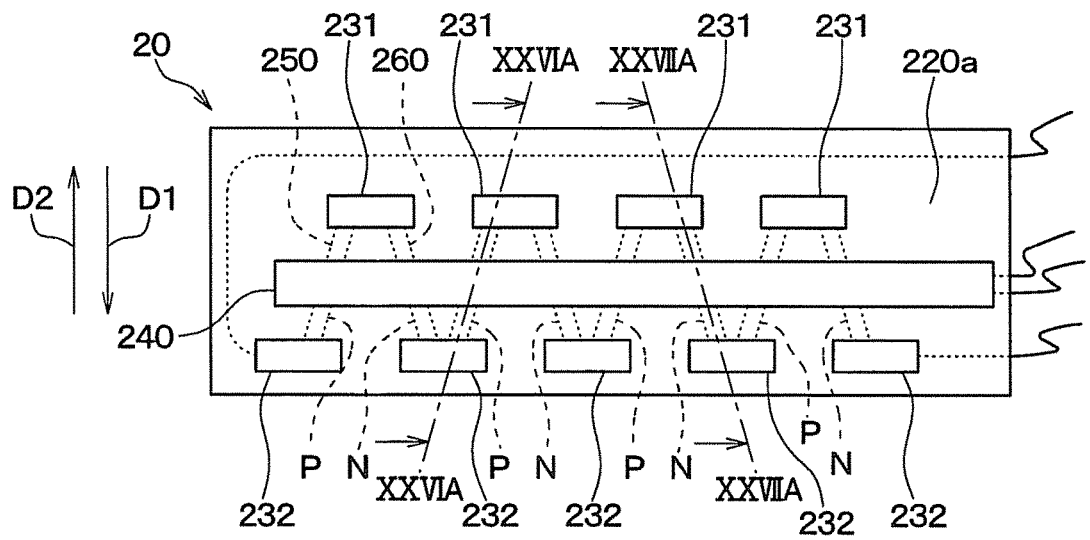
FIG. 24 is a plan view of a flow sensor according to a ninth embodiment.
Figure 25:
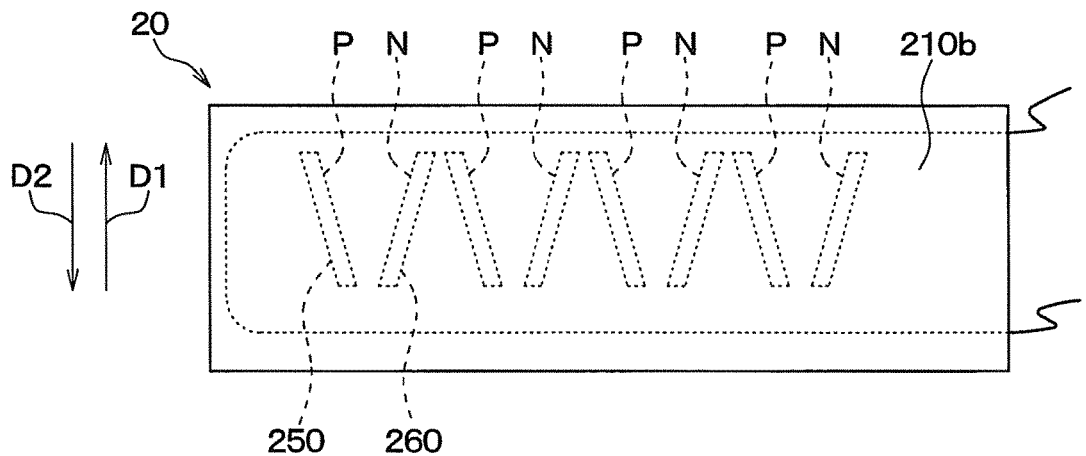
FIG. 25 is a bottom view of the flow sensor according to the ninth embodiment.

As shown in FIG. 22, in measuring the mass flow rate of a fluid, the heater part 240 is operated to generate heat.

In the absence of a fluid flow, heat from the heater part 240 is conducted to form a temperature distribution as shown in the isotherms in FIG. 22 in the fluid present on both of the top face 20a side and the lower face 20b side of the flow sensor 20. At this time, heat released from the heater part 240 to the fluid is equally conducted to the regions sandwiching the heater part 240. Thus, the temperature distribution of the fluid is equal in the regions sandwiching the heater part 240. The distances from the heater part 240 to the first and the second connecting patterns 231 and 232 are equal. Consequently, the temperatures of the first and the second connecting patterns 231 and 232 are equal, causing no temperature difference. Therefore, no electromotive force is generated in the thermoelectric conversion elements of the flow sensor 20.

As shown in FIG. 23, in the presence of a fluid flow, the temperature distributions of the fluid are changed on both of the top face 20a side and the lower face 20b side of the flow sensor 20 compared with the state in the absence of a fluid flow. In other words, as shown in the isotherms in FIG. 23, high temperature portions of the fluid on the top face 20a side and the lower face 20b side of the flow sensor 20 are shifted to the flowing direction D1 of the fluid compared with the state in the absence of a fluid flow. At this time, the temperatures are equal at the locations at which the distances from the heater part 240 are equal on the top face 20a and the lower face 20b. However, the temperature of the second connecting pattern 232 on the downstream side of the fluid flow from the heater part 240 is higher than the temperature of the first connecting pattern 231 on the upstream side of the fluid flow from the heater part 240. Therefore, electromotive force corresponding to the temperature difference between the first and the second connecting patterns 231 and 232 is generated in the thermoelectric conversion elements of the flow sensor 20, and this electromotive force is outputted from the flow sensor 20. As described above, in the thermoelectric conversion elements of the flow sensor 20, electromotive force corresponding to the temperature difference is generated between the region corresponding to the first connecting pattern 231 in the top face 20a and the lower face 20*b* and the region corresponding to the second connecting pattern 232 in the top face 20*a* and the lower face 20*b*. The region corresponding to the first connecting pattern 231 and the region corresponding to the second connecting pattern 232 in the top face 20*a* correspond to the first region located on the one face of the sensor and the second region located at a position different from the first region in the sensor, respectively, described in claims.

At this time, a certain relationship is observed between the temperature difference between the first and the second connecting patterns 231 and 232 of the flow sensor 20 and the mass flow rate of the fluid. Thus, a certain relationship is observed between the electromotive force outputted from the flow sensor 20 and the mass flow rate of the fluid. Therefore, the controller 2 operates the mass flow rate of the fluid based on the level of the electromotive force outputted from the flow sensor 20 and the relationship between the level of the electromotive force and the mass flow rate of the fluid. Thus, the mass flow rate of the fluid can be measured.

As described above, in the present embodiment, the flow sensor 20 is used, in which the one end portion and the other end portion of the thermoelectric conversion element are disposed on both sides of the heater part 240. Thus, even though no temperature difference is generated between the top face 20*a* and the lower face 20*b* of the flow sensor 20, electromotive force is generated when the temperature difference is generated between the fluid on the upstream side and the downstream side of the heater part 240. Thus, according to the present embodiment, as in the first to the fourth embodiments, the mass flow rate of the fluid can be measured without contacting the member resistant to heat transfer with the lower face 20*b* of the flow sensor 20.

As in the first to the fourth embodiments, also in the present embodiment, the flow sensor 20 may be installed at the measurement location with the member resistant to heat transfer being in contact with the lower face 20*b* of the flow sensor 20. In this case, when a fluid having heat released from the heater part 240 is moved along the top face 20*a*, the electromotive force is generated in the level corresponding to the temperature difference generated between the first region located on the upstream side of the heater part 240 in the top face 20*a* and the second region located on the downstream side of the heater part 240 in the top face 20*b* in the thermoelectric conversion elements of the flow sensor 20. When the flowing direction of the fluid is the direction D1 of the flow depicted by an arrow in FIG. 18, the first region is a region corresponding to the first connecting pattern 231, and the second region is a region corresponding to the second connecting pattern 232.

In the present embodiment, the distances from the heater part 240 to the first and the second connecting patterns 231 and 232 are equal. However, the distances may be different. In this case, even in the absence of a fluid flow, the temperature difference is generated between the first and the second connecting patterns 231 and 232. Thus, electromotive force is generated in the thermoelectric conversion elements. In the presence of a fluid flow, compared with the state in the absence of a fluid flow, electromotive force is changed. Therefore, the mass flow rate of the fluid can be found based on the difference between the electromotive force generated in the flow sensor 20 and the electromotive force in the absence of a fluid flow.

(Ninth Embodiment)

As shown in FIGS. 24, 25, 26A and 27A, in the present embodiment, the arrangement of the p-type element 250 and the n-type element 260 is changed in the stacking direction of the insulating layers from the flow sensor 20 according to the eighth embodiment. The other configurations are the same as those in the eighth embodiment.

In a flow sensor 20 according to the present embodiment, a p-type element 250 and an n-type element 260 are disposed between a first insulating layer 210 and a second insulating layer 220.

Figure 26A:
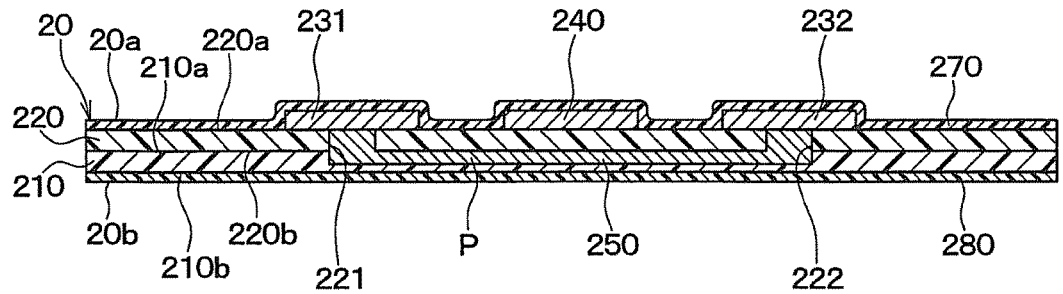
FIG. 26A is a cross-sectional view taken along line XXVIA-XXVIA in FIG. 24.
Figure 26B:
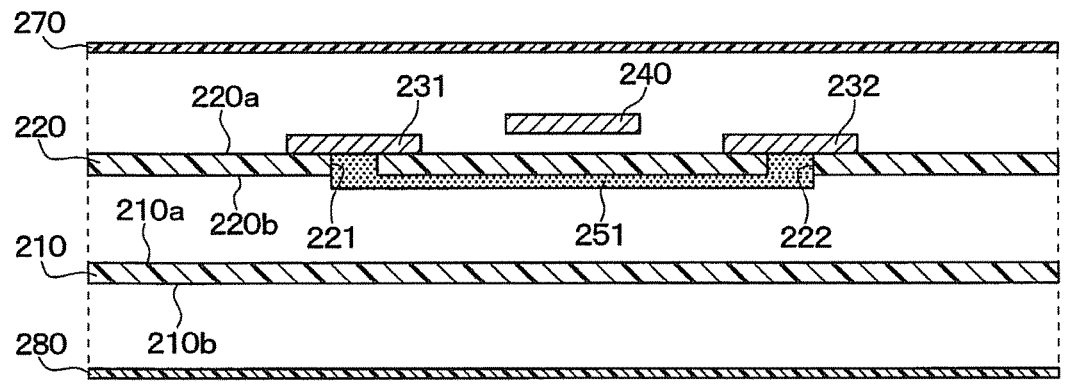
FIG. 26B is a cross-sectional view for explaining the manufacturing process steps of the flow sensor according to the ninth embodiment and is a cross-sectional view corresponding to FIG. 26A.
Figure 27A:
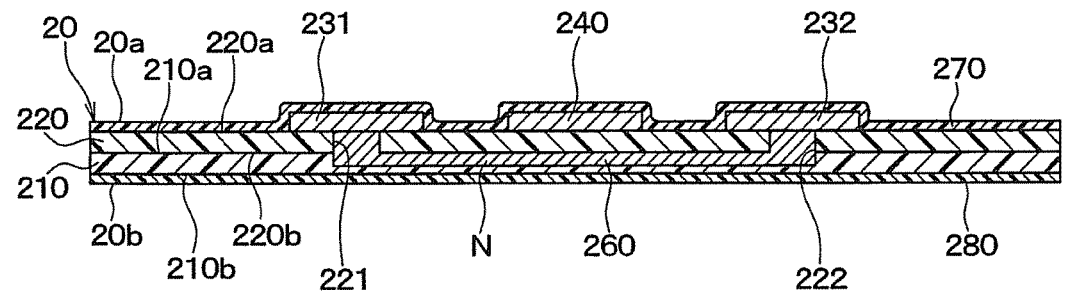
FIG. 27A is a cross-sectional view taken along line XXVIIA-XXVIIA in FIG. 24.
Figure 27B:
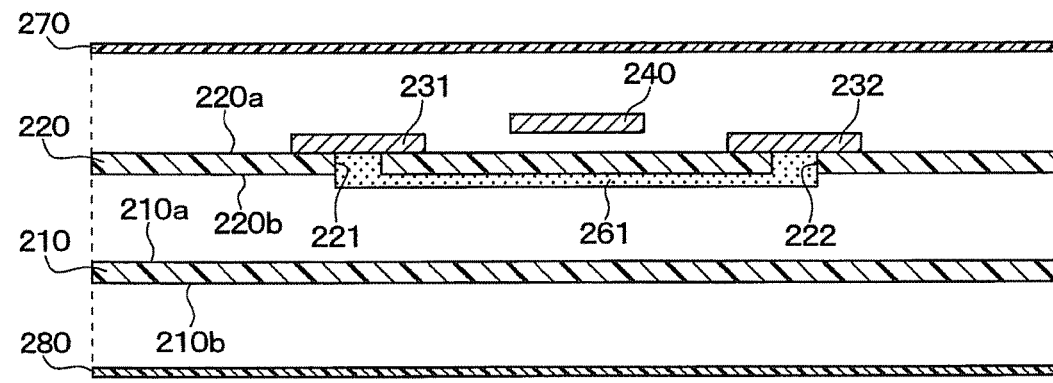
FIG. 27B is a cross-sectional view for explaining the manufacturing process steps of the flow sensor according to the ninth embodiment and is a cross-sectional view corresponding to FIG. 21A.
Figure 28:
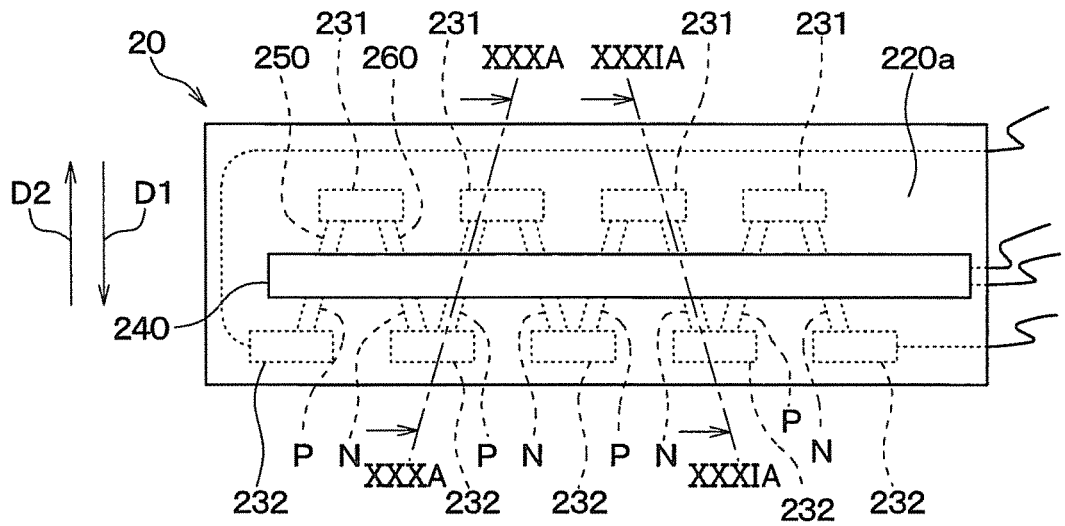
FIG. 28 is a plan view of a flow sensor according to a tenth embodiment.
Figure 29:
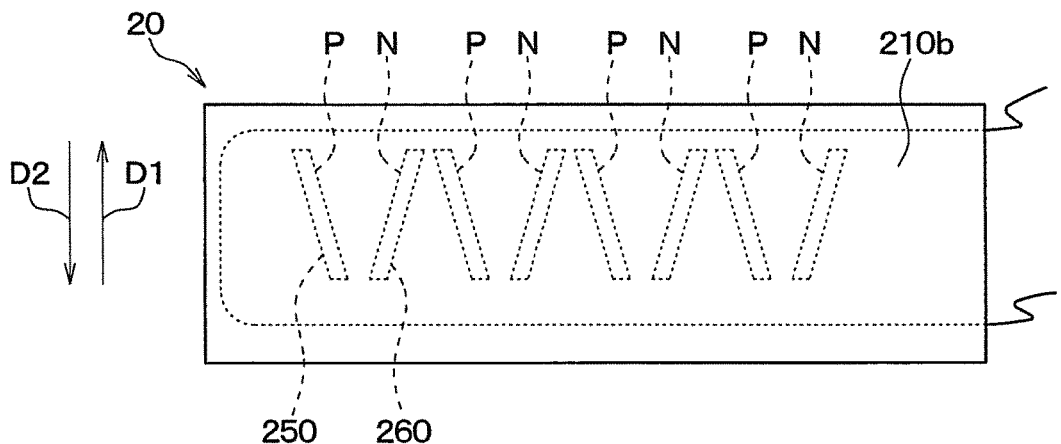
FIG. 29 is a bottom view of the flow sensor according to the tenth embodiment.

The flow sensor 20 according to the present embodiment is manufactured as below. As shown in FIGS. 26B and 27B, a rear face protective film layer 280, the first insulating layer 210, the second insulating layer 220, and a front face protective film layer 270 are prepared. At this time, on the second insulating layer 220, first and second connecting patterns 231 and 232 are formed on a front face 220*a*. On the second insulating layer 220, a p-type element material 251 and an n-type element material 261 are filled in vias 221 and 222, and the patterns of the p-type element material 252 and the n-type element material 261 are formed on a rear face 220*b*. A laminate having the rear face protective film layer 280, the first insulating layer 210, the second insulating layer 220, and the front face protective film layer 270 in turn stacked is pressurized being heated for integration.

Similarly to the eighth embodiment, also in the present embodiment, the mass flow rate of the fluid can be measured. In the present embodiment, the p-type element 250 and the n-type element 260 are both disposed between the first insulating layer 210 and the second insulating layer 220. However, a configuration may be possible in which one of the p-type element 250 and the n-type element 260 is disposed between the first insulating layer 210 and the second insulating layer 220, and the other of the p-type element 250 and the n-type element 260 is disposed on the rear face 210*b* of the first insulating layer 210.

(Tenth Embodiment)

As shown in FIGS. 28, 29, 30A, and 31A, in the present embodiment, the arrangement of the first and the second connecting patterns 231 and 232 in the stacking direction of the insulating layers is changed from the flow sensor 20 according to the ninth embodiment. The other configurations are the same as those of the ninth embodiment.

In a flow sensor 20 according to the present embodiment, in addition to a p-type element 250 and an n-type element 260, first and second connecting patterns 231 and 232 are disposed between a first insulating layer 210 and a second insulating layer 220.

Figure 30A:
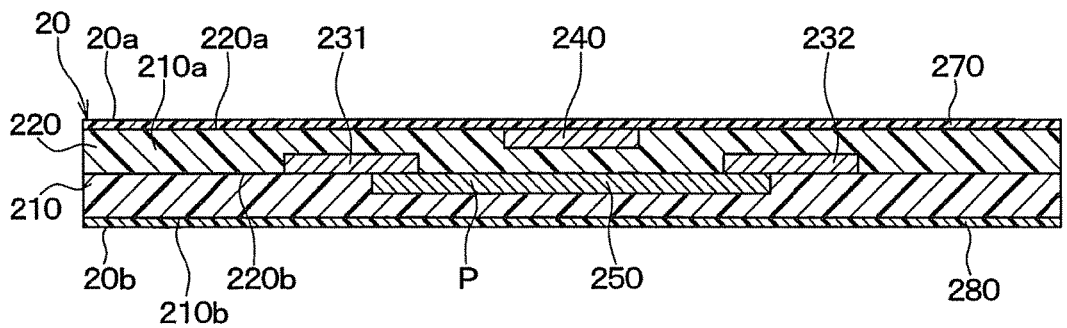
FIG. 30A is a cross-sectional view taken along line XXXA-XXXA in FIG. 28.
Figure 30B:
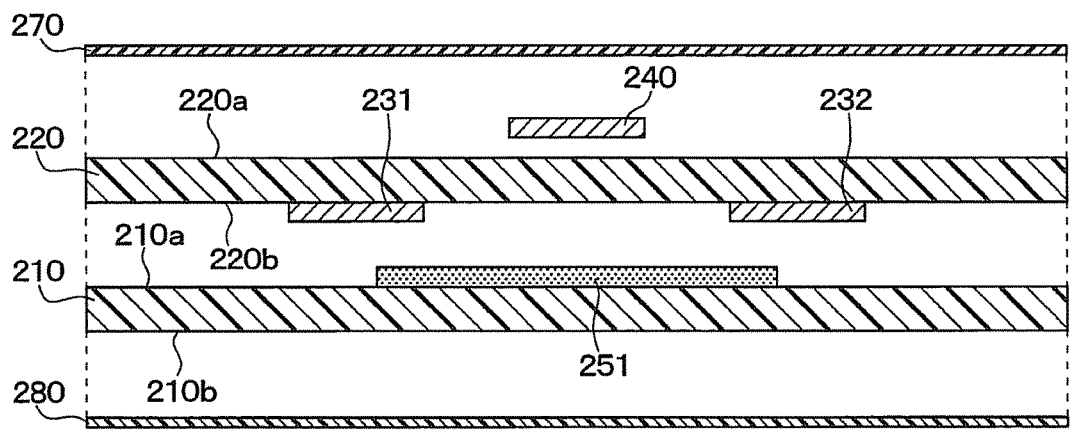
FIG. 30B is a cross-sectional view for explaining the manufacturing process steps of the flow sensor according to the tenth embodiment and is a cross-sectional view corresponding to FIG. 30A.
Figure 31A:
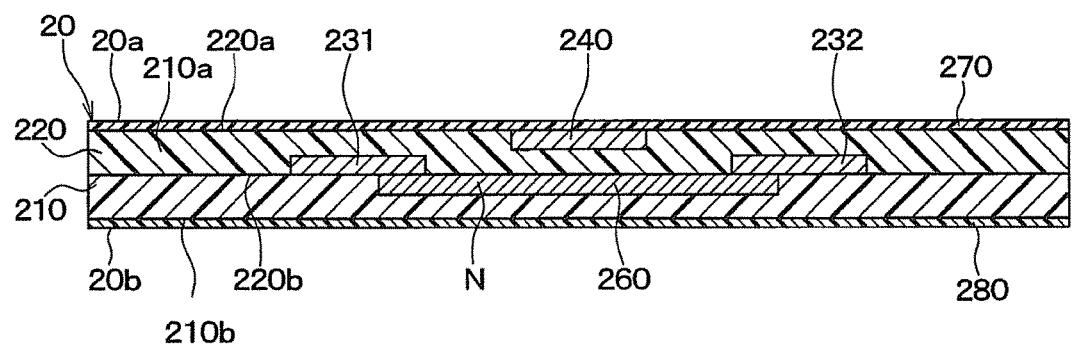
FIG. 31A is a cross-sectional view taken along line XXXIA-XXXIA in FIG. 28.
Figure 31B:
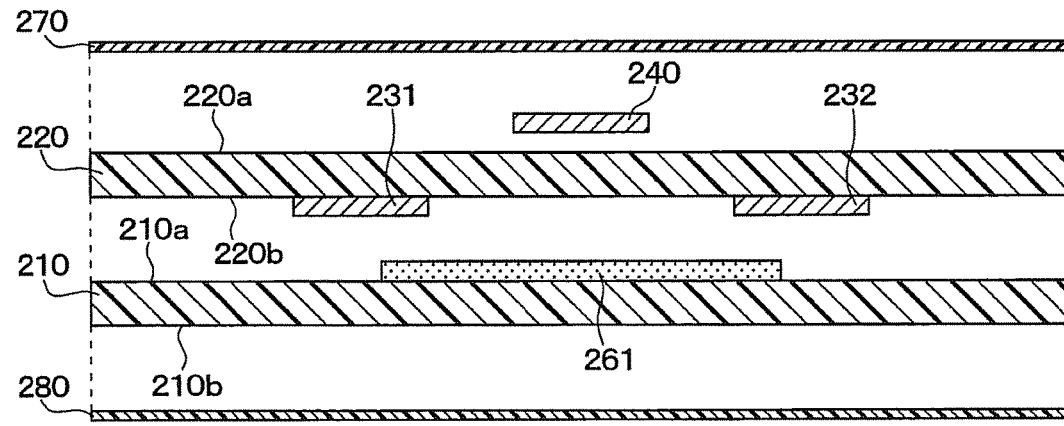
FIG. 31B is a cross-sectional view for explaining the manufacturing process steps of the flow sensor according to the tenth embodiment and is a cross-sectional view corresponding to FIG. 31A.

The flow sensor 20 according to the present embodiment is manufactured as below. As shown in FIGS. 30B and 31B, a rear face protective film layer 280, the first insulating layer 210, the second insulating layer 220, and a front face protective film layer 270 are prepared. At this time, on a front face 210*a* of the first insulating layer 210, the patterns of a p-type element material 251 and an n-type element material are formed. On a rear face 220*b* of the second insulating layer 220, first and second connecting patterns 231 and 232 are formed. On a front face 220*a* of the second insulating layer 220, a heater part 240 is disposed. The rear face protective film layer 280, the first insulating layer 210, the second insulating layer 220, and the front face protective film layer 270 are in turn stacked to form a laminate. This laminate is pressurized being heated for integration.

Figure 32:
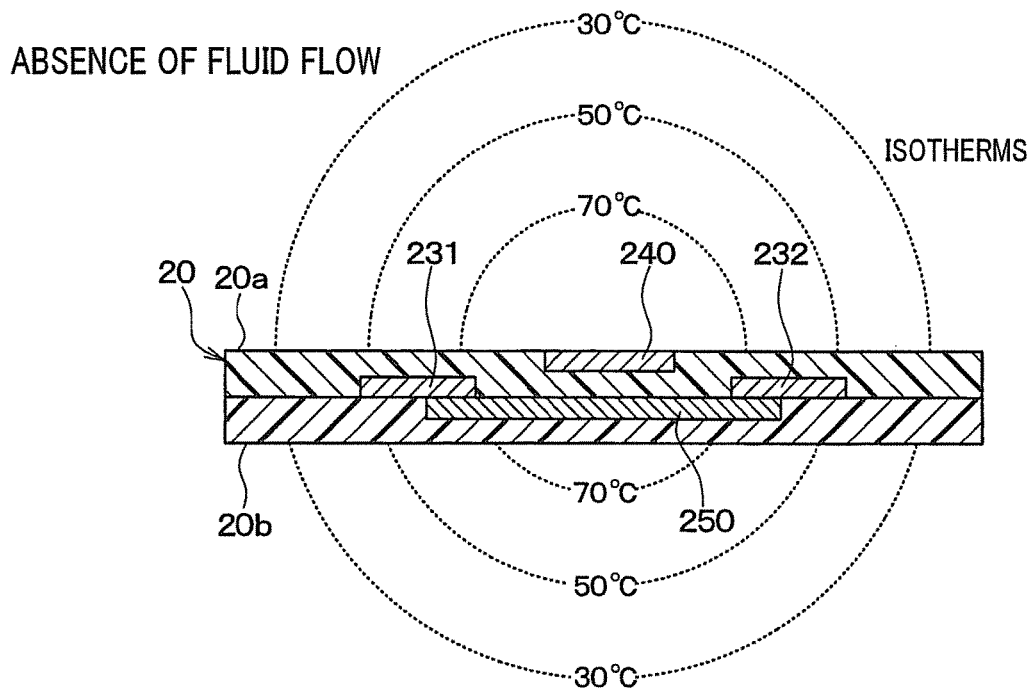
FIG. 32 is a diagram of a temperature distribution near the flow sensor in the absence of a fluid flow in the tenth embodiment.
Figure 33:
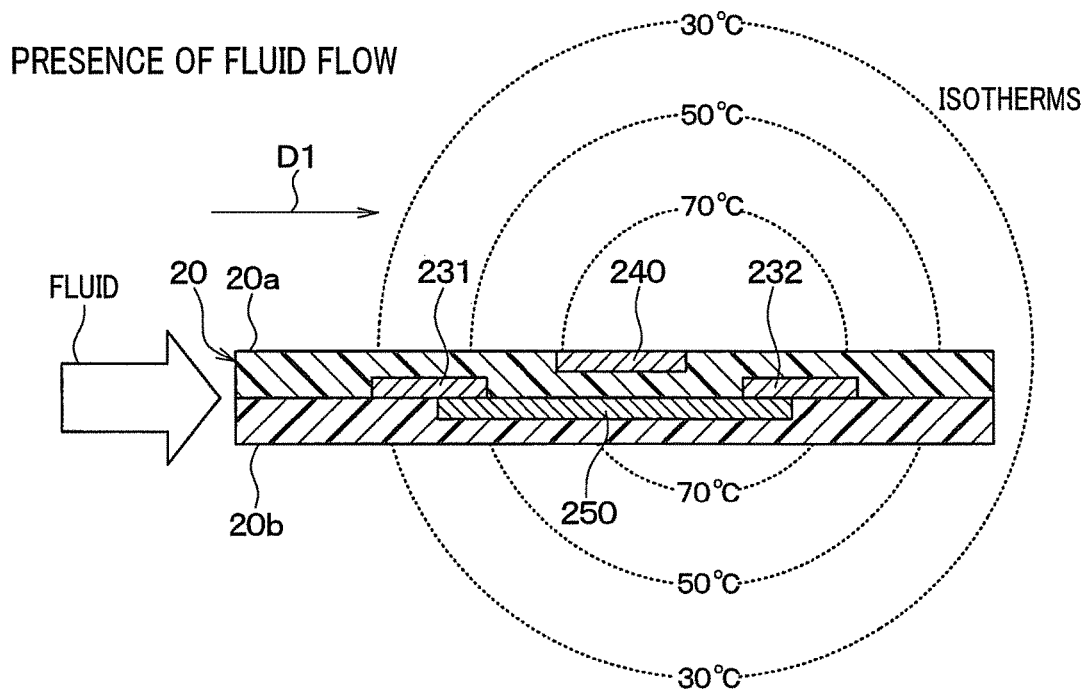
FIG. 33 is a diagram of a temperature distribution near the flow sensor in the presence of a fluid flow in the tenth embodiment.

Also in the present embodiment, in the absence of a fluid flow shown in FIG. 32, no temperature difference is generated between the first and the second connecting patterns 231 and 232. In the presence of a fluid flow shown in FIG. 33, the temperature difference is generated between the first and the second connecting patterns 231 and 232. Thus, similarly to the eighth and the ninth embodiments, also in the present embodiment, the mass flow rate of the fluid can be measured.

(Eleventh Embodiment)

Figure 34:
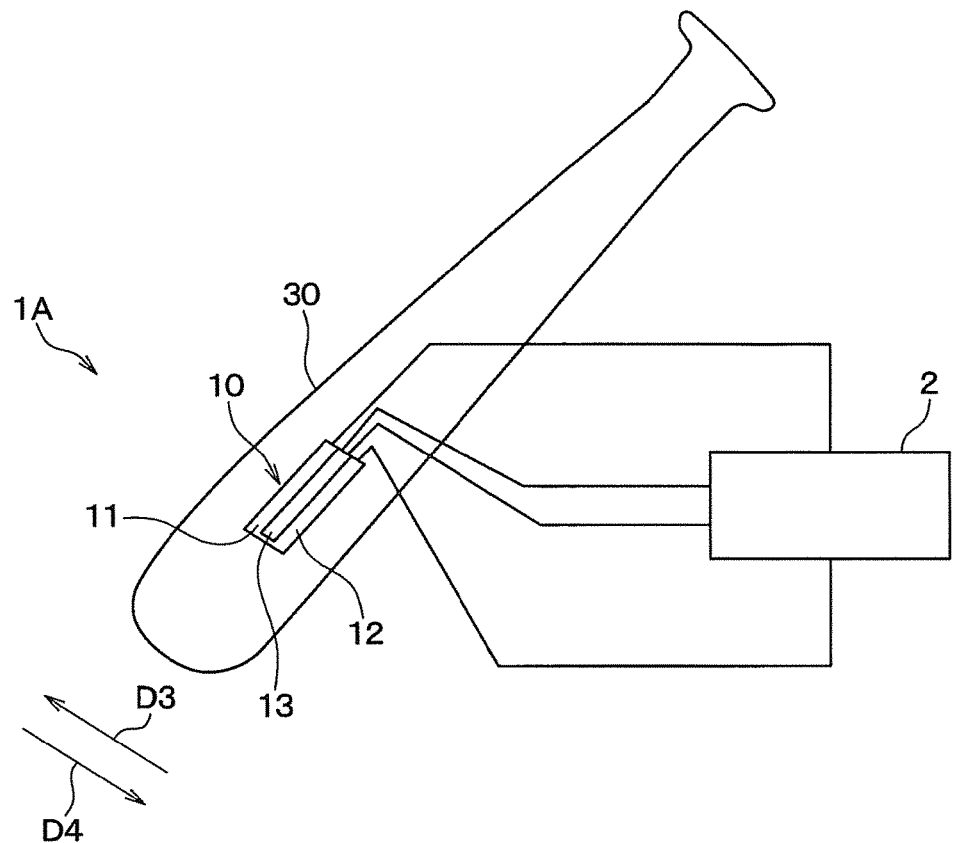
FIG. 34 is a diagram of the overall structure of a velocimeter according to an eleventh embodiment.

In the present embodiment, a velocimeter for measuring the velocity of a moving object will be described. As shown in FIG. 34, a velocimeter 1A includes a velocity sensor 10 installed on a moving object 30 and a controller 2.

The moving object 30 is moved in the inside of a fluid. In the present embodiment, the moving object 30 is a baseball bat. In swinging a bat, the bat is moved in air, which is a fluid. On the front face of the bat, one velocity sensor 10 is attached.

The velocity sensor 10 according to the present embodiment has a structure the same as the structure of the flow sensor 10 according to the first embodiment. Thus, similarly to the flow sensor 10 according to the first embodiment, the velocity sensor 10 according to the present embodiment is less breakable than a sensor having a diaphragm structure is.

The velocity sensor 10 is fixed to the moving object 30 in such a manner that first and second sensor parts 11 and 12 are located on both sides of a heater part 13 in the direction parallel with moving directions D3 and D4 of the moving object 30. Preferably, wires for electrically connecting the velocity sensor 10 to the controller 2 are wound on the moving object 30 or are disposed in the inside of the moving object 30 through a hole formed on the moving object 30. The gathered wires will not be obstacles.

Figure 35:
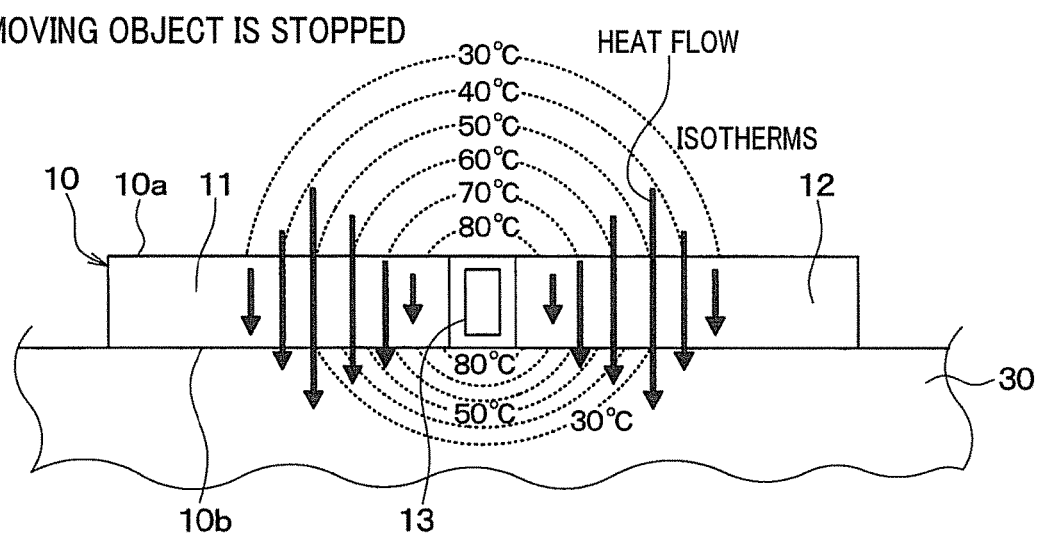
FIG. 35 is a diagram of a temperature distribution near the velocity sensor in the state in which a moving object is stopped, in the eleventh embodiment.
Figure 36:
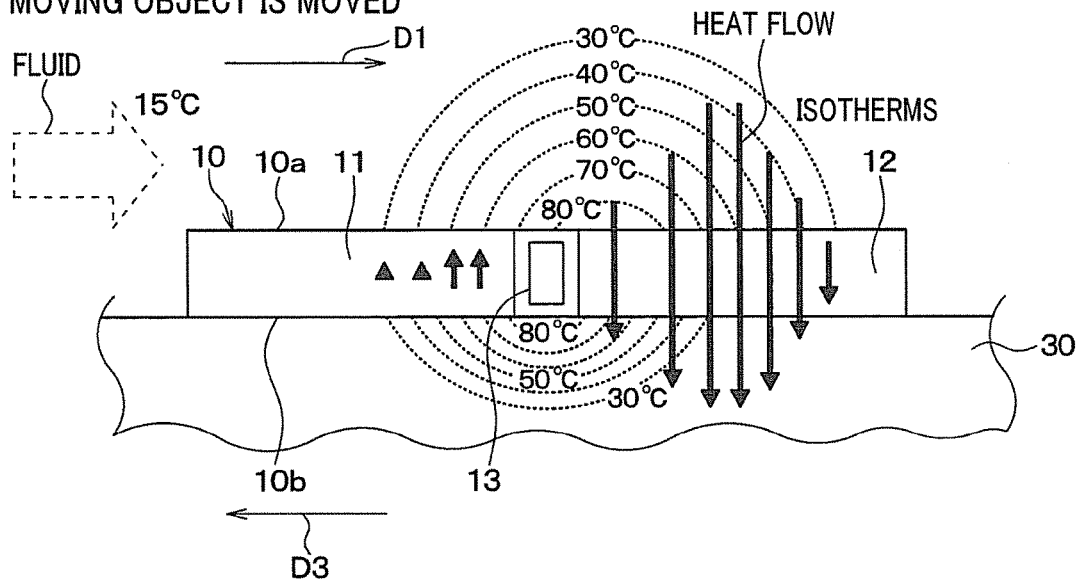
FIG. 36 is a diagram of a temperature distribution near the velocity sensor in the state in which a moving object is moving in the eleventh embodiment.

Next, referring to FIGS. 35 and 36, a measuring method for the rate of travel of the moving object 30 using the velocimeter 1A according to the present embodiment will be described. FIGS. 35 and 36 are diagrams corresponding to FIGS. 5 and 6.

First, in measuring the rate of travel of the moving object 30, the heater part 13 is operated to generate heat.

As shown in FIG. 35, when the moving object 30 halts, a temperature distribution shown in the isotherms in FIG. 35 is formed in a fluid present on the top face 10a side of the velocity sensor 10, i.e. in air in the present embodiment as well as a temperature distribution shown in the isotherms in FIG. 35 is formed on the moving object 30 on the lower face 10b side of the velocity sensor 10. The temperature distributions formed on the fluid and the moving object 30 at this time are the same as in the absence of a flow rate of a fluid described in the first embodiment.

On the other hand, as shown in FIG. 36, when the moving object 30 is moving in the direction D3, the state is the same as the state in which air (a fluid) relatively flows along the top face 10a of the velocity sensor 10 to the direction opposite to the moving direction D3 of the moving object 30 when viewed from the velocity sensor 10. Thus, as shown in the isotherms in FIG. 36, the temperature distributions formed on the fluid and the moving object 30 are the same as in the presence of the flow rate of a fluid described in the first embodiment.

From these facts, the rate of travel of the moving object 30 using the velocimeter 1A can be measured by a method basically similar to the method in measuring the mass flow rate of the fluid using the mass flowmeter 1 according to the first embodiment.

In other words, when the moving object 30 is moved, the temperature difference is generated on the regions of the first and second sensor parts 11 and 12 on the top face 10a of the multi-layer substrate 10. Thus, the electromotive force combining the electromotive forces generated in the first and the second sensor parts 11 and 12 of the flow sensor 10 is outputted from the velocity sensor 10. At this time, a certain relationship is observed between the temperatures in the regions of the first and the second sensor parts 11 and 12 on the top face 10a of the multi-layer substrate 10 and the rate of travel of the moving object 30. Thus, a certain relationship is observed between the electromotive force outputted from the velocity sensor 10 and the rate of travel of the moving object 30. Therefore, the controller 2 operates the rate of travel of the moving object 30 based on the level of electromotive force outputted from the velocity sensor 10 and the relationship between the level of the electromotive force and the rate of travel of the moving object 30. Thus, the rate of travel of the moving object 30 can be measured.

Therefore, according to the velocimeter 1A of the present embodiment, a velocity of a swing of a bat when swinging the bat can be measured.

In the present embodiment, a baseball bat is taken as an example of the moving object 30. However, in addition to the baseball bat, the moving object 30 may be a golf club, tennis racket, and Ping-Pong bat. Other than these, the moving object 30 includes movable parts of manufacture facilities and arm robots and game machine controllers. Note that, presently, there are game machine controllers using an acceleration sensor. The reactions of a controller using an acceleration sensor are great even when the controller is just hit. However, in the case of using the velocity sensor 20 according to the present embodiment, it is not possible to induce a great reaction unless the controller is actually quickly moved.

In the present embodiment, as the velocity sensor 10, a sensor having a structure the same as the structure of the flow sensor 10 according to the first embodiment is used. However, a sensor having a structure the same as the structure of the flow sensor 10 according to the second to the seventh embodiments and the flow sensor 20 according to eighth to the tenth embodiments may be used.

(Other Embodiments)

The present invention is not limited to the foregoing embodiments. The present invention can be appropriately changed within the scope described in claims as below.

(1) In the foregoing embodiments, the heat source is integrated with the multi-layer substrate configuring the sensor. However, the heat source may be a separate component from the multi-layer substrate. In the first and the eighth embodiments, for example, the heater parts 13 and 240 are used as a heat source. However, a heat source that releases cold heat may be used. In the eighth to the tenth embodiments, the heater part 240 is used as a heat source. However, the Peltier element part 14 described in the seventh embodiment may be used.

(2) In the foregoing embodiments, the mass flow rate of the fluid and the rate of travel of the moving object are calculated based on the voltage value generated in the sensor. However, the mass flow rate of the fluid and the rate of travel of the moving object may be calculated based on a current value instead of the voltage value. In short, the mass flow rate of the fluid and the rate of travel of the moving object can be calculated based on electrical outputs, such as voltages and electric currents generated in the thermoelectric conversion element.

(3) In the foregoing embodiments, the metals forming the first and the second interlayer connecting members 130 and 140 are a Bi—Sb—Te alloy and a Bi—Te alloy, respectively. However, the metals may be other alloys. In the foregoing embodiments, the metals forming the first and the second interlayer connecting members 130 and 140 are a solid-phase sintered sintering alloy. However, at least one of the first and the second interlayer connecting members 130 and 140 only has to be made of a solid-phase sintered sintering alloy. Thus, compared with the case in which the metals forming the first and the second interlayer connecting members 130 and 140 are not solid-phase sintered metals, electromotive force can be increased, allowing an increase in the sensitivities of the flow sensor and the velocity sensor.

Figure 37:
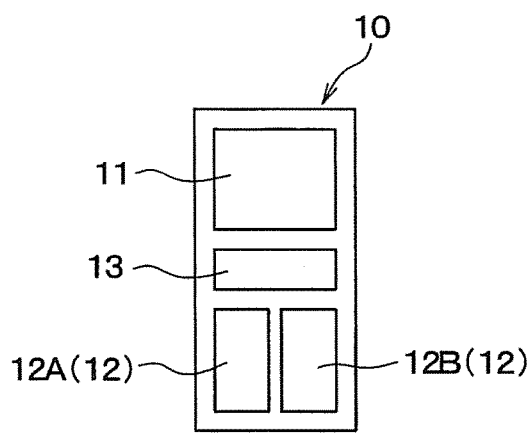
FIG. 37 is a plan view of a flow sensor according to another embodiment.
Figure 38:
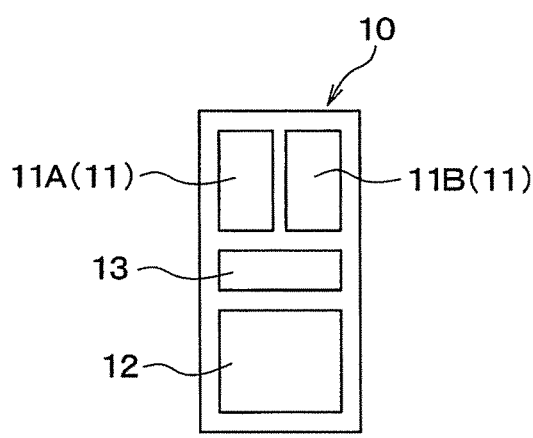
FIG. 38 is a plan view of a flow sensor according to another embodiment.
Figure 39:
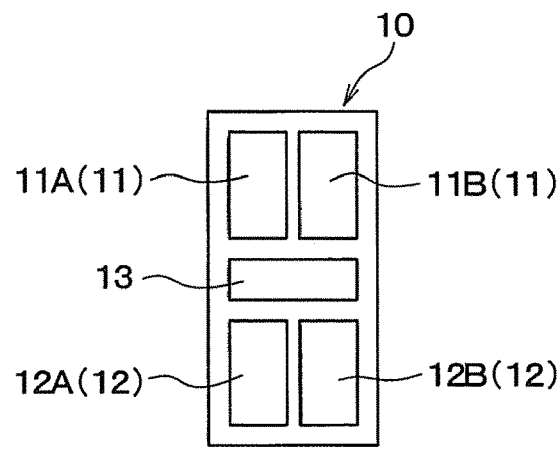
FIG. 39 is a plan view of a flow sensor according to another embodiment.

(4) As shown in FIG. 2A, in the flow sensor 10 according to the first to the sixth embodiments, the configuration of one flow sensor 10 is configured in which one thermoelectric conversion element 11 and one thermoelectric conversion element 12 are disposed sandwiching the heater part 13. However, the other configurations may be possible. For example, as shown in FIG. 37, the configuration of one flow sensor 10 may be configured in which in the regions sandwiching the heater part 13, one thermoelectric conversion element 11 is disposed on one side (on the upper side in FIG. 37) and the two thermoelectric conversion elements 12A and 12B are disposed on the other side (on the lower side in FIG. 37). As shown in FIG. 38, a configuration may be possible in which two thermoelectric conversion elements 11A and 11B are disposed on one side of the regions sandwiching the heater part 13 and one thermoelectric conversion element 12 is disposed on the other side. As shown in FIG. 39, a configuration may be possible in which two thermoelectric conversion elements 11A and 11B are disposed on one side of the regions sandwiching the heater part 13 and two thermoelectric conversion elements 12A and 12B are disposed on the other side. As described above, the numbers of the thermoelectric conversion elements 11 and 12 disposed on the one side and the other side of the regions sandwiching the heater part 13 can be freely changed. Similarly, also in the seventh embodiment, the numbers of the thermoelectric conversion elements 11 and 12 disposed on one side and the other side of the regions sandwiching the Peltier element part 14 can be freely changed. The thermoelectric conversion elements 11 and 12 in FIGS. 37 to 39 are the thermoelectric conversion elements formed in the first and the second sensor parts 11 and 12. One thermoelectric conversion element referred here is configured in which the first interlayer connecting member 130 is connected in series to the second interlayer connecting member 140.

Figure 40:
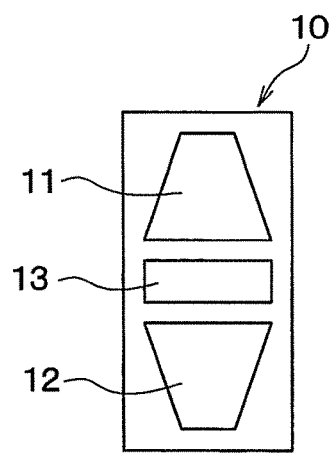
FIG. 40 is a plan view of a flow sensor according to still another embodiment.
Figure 41:
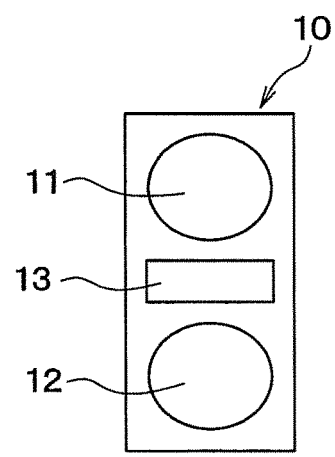
FIG. 41 is a plan view of a flow sensor according to yet another embodiment.
Figure 42:
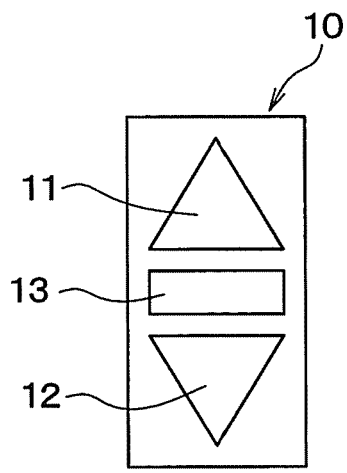
FIG. 42 is a plan view of a flow sensor according to still yet another embodiment.
Figure 43:
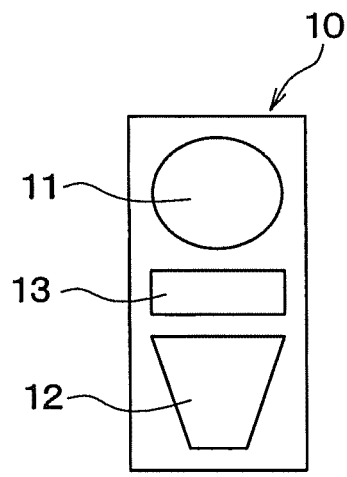
FIG. 43 is a plan view of a flow sensor according to still another embodiment.

(5) As shown in FIG. 2A, in the flow sensor 10 according to the first to the sixth embodiments, the planar shapes of two thermoelectric conversion elements 11 and 12 disposed sandwiching the heater part 13 are rectangles. However, other shapes may be possible. For example, the planar shapes of two thermoelectric conversion elements 11 and 12 may be a trapezoid shown in FIG. 40, a circle shown in FIG. 41, or a triangle shown in FIG. 42. Alternatively, the shapes of two thermoelectric conversion elements 11 and 12 may be different shapes as shown in FIG. 43, not the same shape. The planar shape of the thermoelectric conversion element is the planar shape of the region in which the thermoelectric conversion element is formed. In other words, the planar shape is a planar shape formed by a line. The line is drawn to surround all the first and the second interlayer connecting members 130 and 140 along the first and the second interlayer connecting members 130 and 140 located on the outermost circumferential area in the regions in which the first and the second interlayer connecting members 130 and 140 are formed. This is the same in the flow sensor 10 according to the seventh embodiment.

(6) In the first to the seventh embodiments, a plurality of insulating layers, i.e. the insulating base material 100, the front face protective member 110, and the rear face protective member 120 are formed of thermoplastic resins. However, they may be formed of other flexible materials, such as a thermosetting resin and rubber. Similarly, also in the eighth to the tenth embodiments, a plurality of insulating layers 210, 220, 270, and 280 may be formed of other flexible materials, such as a thermosetting resin and rubber. The flexible material only has to be materials that can integrate a plurality of insulating layers by heat sealing.

(7) In the first to the seventh embodiments, the flow sensor 10 has a multi-layer structure in which a plurality of insulating layers 100, 110, and 120 is stacked. However, the flow sensor 10 may have a structure in which first and second conductors (e.g. the first and the second interlayer connecting members 130 and 140) are formed on one insulating layer (e.g. the insulating base material 100). Also in this case, a structure can be manufactured by pressurizing and heating one insulating layer 100 and the first and the second conductors 130 and 140 for integration. Similarly, also in the flow sensor 20 according to the eighth to the tenth embodiments, a structure may be formed in which first and second conductors (e.g. the p-type element 250 and the n-type element 260) are formed on one insulating layer.

(8) In the foregoing embodiments, the flow sensors 10 and 20 are manufactured by pressurizing and heating a plurality of insulating layers for integration. However, the flow sensors 10 and 20 may be manufactured by other manufacturing methods. For example, the flow sensor 10 may be manufactured by a method in which the insulating base material 100 in the structure shown in (a) in FIG. 4 is formed of an adhesive material and the insulating base material 100 is attached to the front face pattern and the rear face pattern. Alternatively, the flow sensor 10 in the multi-layer structure shown in FIG. 3 may be manufactured by a method in which a conductor pattern and an insulating layer are in turn stacked on the front face and the rear face of the insulating base material 100 in the structure shown in (a) in FIG. 4.

The flow sensors 10 and 20 are not limited to the structures of the foregoing embodiments. Other structures may be possible as long as the thermoelectric conversion element is formed in the inside of the flow sensor. The foregoing other embodiments are also applicable to the velocity sensor according to the eleventh embodiment.

(9) The foregoing embodiments are not independent of one another, which can be appropriately combined with one another except the case in which it is certainly not possible to combine them. In the foregoing embodiments, it is of course without saying that components configuring the embodiments are not necessarily required except the case in which they are explicitly required and the case in which they are theoretically explicitly required, for example.

REFERENCE SIGNS LIST

2 Controller (operating unit)
10 Flow sensor, velocity sensor (sensor)
11 First sensor part
12 Second sensor part
13 Heater part (heat source)
14 Peltier element part (heat source)
130 First interlayer connecting member (first conductor)
140 Second interlayer connecting member (second conductor)
240 Heater part
250 P-type element (first conductor)
260 N-type element (second conductor)

The invention claimed is:

1. A mass flowmeter comprising:
a sensor having one face and an other face on an opposite side of the one face, the sensor having a thermoelectric conversion element formed therein; and
a heat source configured to release one of heat and cold to a fluid present on the one face side, wherein:
the sensor is comprised of a multi-layer substrate including a plurality of stacked insulating layers formed of a thermoplastic resin and a first conductor and a second conductor formed on the insulating layers, the first conductor and the second conductor are formed of different conductors, the first conductor and the second conductor are connected to each other, and the multi-layer substrate is formed by pressurizing and heating the plurality of insulating layers so as to be integrated;
the thermoelectric conversion element is configured of the first conductor and the second conductor connected to each other, and when the fluid having heat released from the heat source moves along the one face, the thermoelectric conversion element is configured to generate an electrical output corresponding to a temperature difference generated between a first region located on the one face and a second region located at a position different from the first region in the sensor;
the mass flowmeter further includes an operating unit configured to calculate a mass flow rate of the fluid based on the output generated in the thermoelectric conversion element and a relationship between the output and a mass flow rate of the fluid;
the sensor includes, as the thermoelectric conversion element, a first thermoelectric conversion element and a second thermoelectric conversion element sandwiching the heat source in a direction in parallel with the one face;
when the fluid having heat released from the heat source is moved along the one face, the first thermoelectric conversion element generates the output in a level corresponding to a temperature difference generated between the first region located on the one face in a region in which the first thermoelectric conversion element is formed in the sensor and the second region located on the other face, and the second thermoelectric conversion element generates the output in a level corresponding to a temperature difference generated between the first region located on the one face in a region in which the second thermoelectric conversion element is formed in the sensor and the second region located on the other face;
the first thermoelectric conversion element and the second thermoelectric conversion element are configured to have different polarities of the output when a relationship between a high temperature side and a low temperature side is equal on the one face and the other face; and
the operating unit operates a mass flow rate of the fluid based on a total output combining the outputs generated in the first thermoelectric conversion element and the second thermoelectric conversion element and a relationship between the total output and a mass flow rate of the fluid.

2. The mass flowmeter according to claim 1, wherein
the thermoelectric conversion element has a structure in which the first conductor and the second conductor are embedded in a first via hole and a second via hole formed through the insulating layer in a thickness direction.

3. The mass flowmeter according to claim 1, wherein
when the fluid having heat released from the heat source is moved along the one face, the thermoelectric conversion element generates the output in a level corresponding to a temperature difference generated between the first region located on an upstream side of the heat source in the one face and the second region located on a downstream side of the heat source in the one face.

4. The mass flowmeter according to claim 1, wherein
the thermoelectric conversion element has a structure in which the first conductor and the second conductor are formed along a front face of the insulating layer, and one end portion and an other end portion of the first conductor and the second conductor are disposed so as to sandwich the heat source in a direction in parallel with the one face.

5. The mass flowmeter according to claim 1, wherein
the sensor is installed at a measurement location of a mass flow rate of the fluid in a state in which a member is present on the other face and is more resistant to heat transfer than the fluid.

6. The mass flowmeter according to claim 5, wherein
the member is provided on the other face and is more resistant to heat transfer than the fluid.

7. The mass flowmeter according to claim 1, wherein
the heat source is a Peltier element formed on the multi-layer substrate, and the heat source releases heat from the one face and releases cold heat from the other face.

* * * * *